(12) United States Patent
Yano

(10) Patent No.: US 10,979,684 B2
(45) Date of Patent: Apr. 13, 2021

(54) IMAGE PROCESSING APPARATUS, INFORMATION PROCESSING METHOD, AND PROGRAM FOR ASSOCIATING AN ELEMENT IN A BACKGROUND SHAPE MODEL WITH AN IMAGE CAPTURING APPARATUS

(71) Applicant: CANON KABUSHIKI KAISHA, Tokyo (JP)

(72) Inventor: Tomohiro Yano, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 90 days.

(21) Appl. No.: 16/202,550

(22) Filed: Nov. 28, 2018

(65) Prior Publication Data

US 2019/0174108 A1 Jun. 6, 2019

(30) Foreign Application Priority Data

Dec. 4, 2017 (JP) .............................. JP2017-232886
Jul. 4, 2018 (JP) .............................. JP2018-127416

(51) Int. Cl.
*G06K 9/00* (2006.01)
*H04N 13/111* (2018.01)
(Continued)

(52) U.S. Cl.
CPC .............. *H04N 13/111* (2018.05); *G06T 7/55* (2017.01); *G06T 15/04* (2013.01); *G06T 15/205* (2013.01); *G06T 17/00* (2013.01); *H04N 13/282* (2018.05)

(58) Field of Classification Search
CPC ...... H04N 13/111; H04N 13/282; G06T 7/55; G06T 15/04; G06T 15/205; G06T 17/00
(Continued)

(56) References Cited

U.S. PATENT DOCUMENTS

2010/0329358 A1* 12/2010 Zhang .................. H04N 19/187
375/240.26
2015/0055937 A1* 2/2015 Van Hoff ........... G06Q 30/0269
386/285
(Continued)

FOREIGN PATENT DOCUMENTS

CN 101695140 A 4/2010
CN 101771893 A 7/2010
(Continued)

OTHER PUBLICATIONS

Grau, Oliver et al., "A Free-Viewpoint Video System for Visualization of Sport Scenes," SMPTE Motion Imaging Journal, May/Jun. 2007, pp. 213 to 219.
(Continued)

*Primary Examiner* — Gabriel I Garcia
(74) *Attorney, Agent, or Firm* — Venable LLP

(57) ABSTRACT

An information processing apparatus comprises: a capturing information obtaining unit for obtaining capturing information on plural capturing apparatuses for capturing images in plural directions; a model information obtaining unit for obtaining model information on a background shape model indicating a three-dimensional shape of a background of a virtual viewpoint image generated by an image generating unit using the images captured by the capturing apparatuses; and an information generating unit for generating related information associating at least one of the capturing apparatuses with a partial region of the background shape model, based on the obtained capturing information and the obtained model information, wherein the related information is used to determine which one of the capturing apparatuses is to capture the image used by the image generating unit to decide a pixel value corresponding to the partial region in the virtual viewpoint image.

19 Claims, 24 Drawing Sheets

(51) Int. Cl.
*G06T 15/20* (2011.01)
*G06T 17/00* (2006.01)
*G06T 15/04* (2011.01)
*G06T 7/55* (2017.01)
*H04N 13/282* (2018.01)

(58) Field of Classification Search
USPC .......................................................... 382/154
See application file for complete search history.

(56) References Cited

U.S. PATENT DOCUMENTS

2017/0171570 A1   6/2017   Mitsumoto
2020/0322591 A1   10/2020  Yano et al.

FOREIGN PATENT DOCUMENTS

| CN | 107018355 A | 8/2017 |
| EP | 2 413 286 A1 | 2/2012 |
| EP | 3 182 694 A1 | 6/2017 |
| JP | 2014-215828 A | 11/2014 |
| WO | 2017/204174 A1 | 11/2017 |
| WO | 2017/204175 A1 | 11/2017 |

OTHER PUBLICATIONS

Kilner, JJM et al., "A Comparative Study of Free-Viewpoint Video Techniques for Sports Events," Centre for Vision, Speech, and Signal Processing, University of Surrey, United Kingdom.
Extended European Search Report dated Apr. 30, 2019, issued in corresponding European Patent Application No. 18208659.5.
Dec. 1, 2020 Chinese Official Action in Chinese Patent Appln. No. 201811464278.9.

* cited by examiner

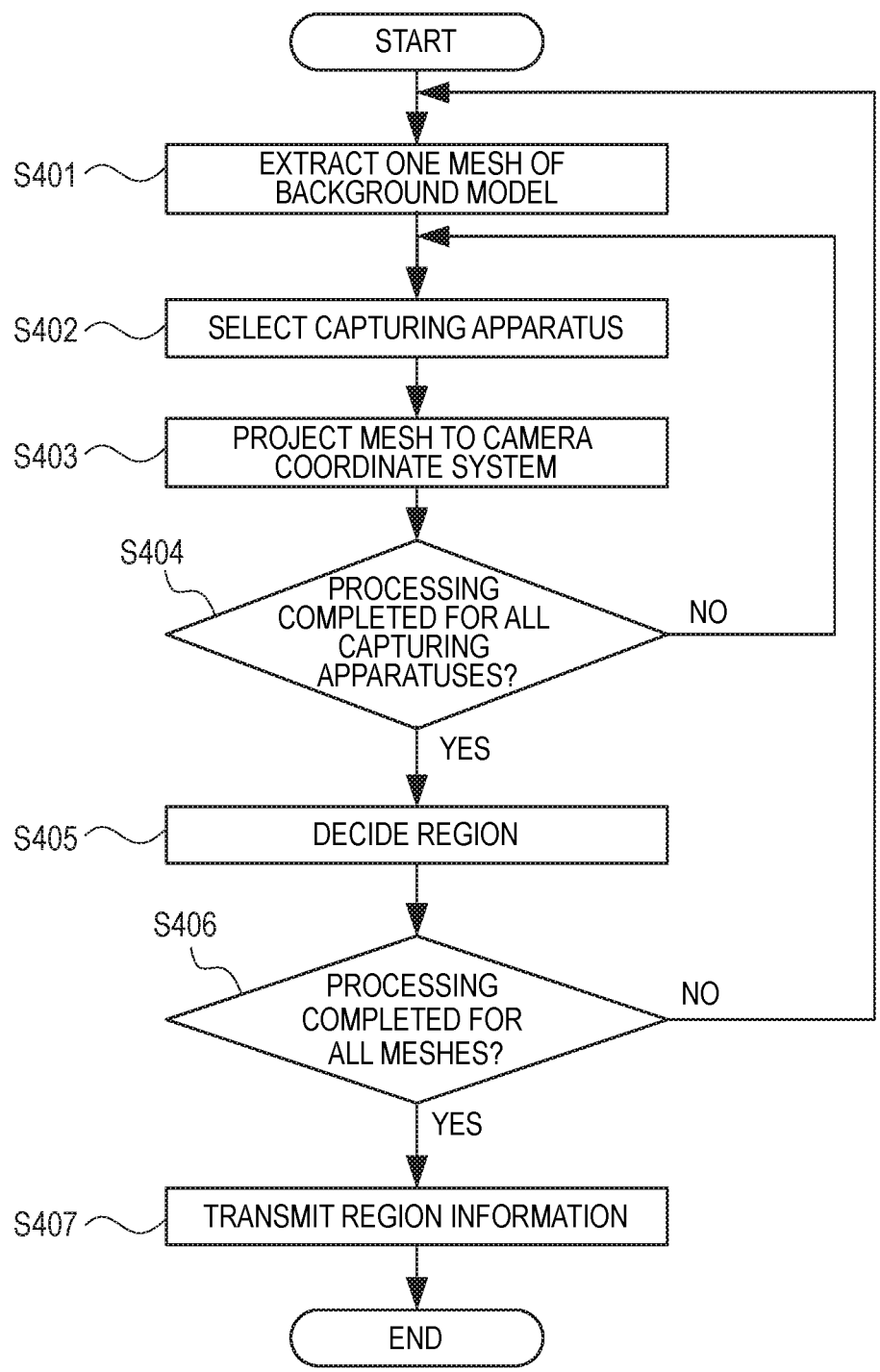

FIG. 10
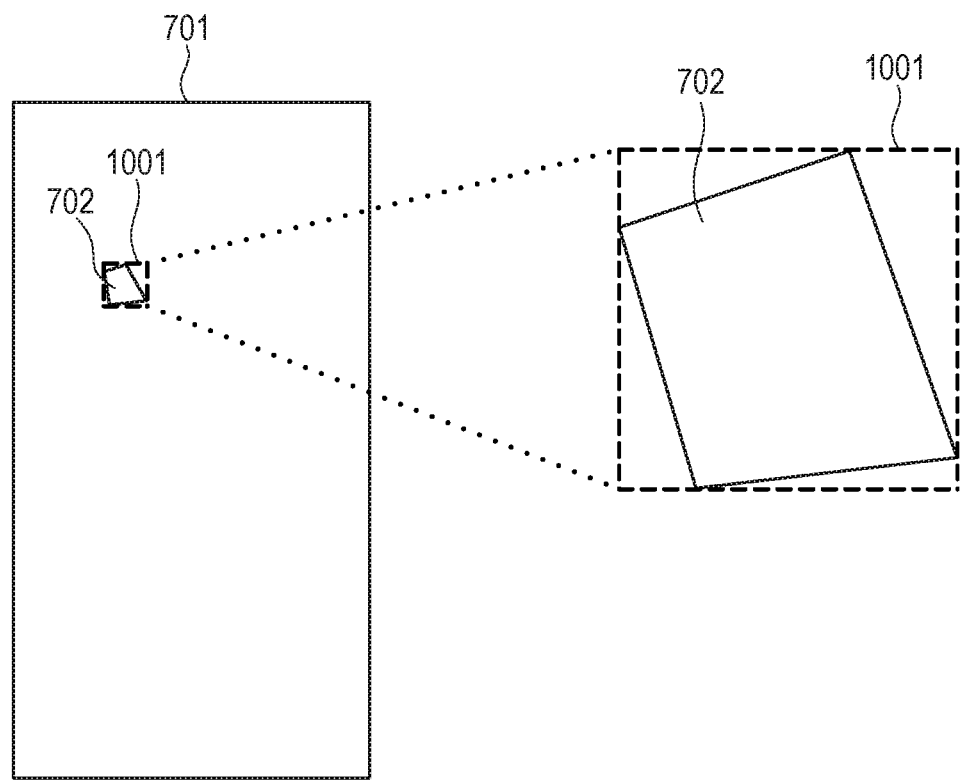
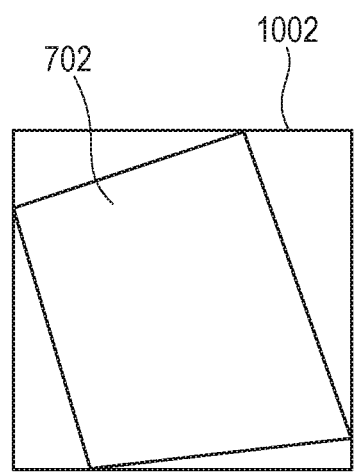

FIG. 19

| RANK | CAPTURING APPARATUS |
|---|---|
| 1 | 101f |
| 2 | 101d |
| 3 | 101g |
| 4 | 101c |
| 5 | 101b |
| 6 | 101h |
| ... | ... |
| 17 | 101l |
| 18 | 101k |

IMAGE PROCESSING APPARATUS, INFORMATION PROCESSING METHOD, AND PROGRAM FOR ASSOCIATING AN ELEMENT IN A BACKGROUND SHAPE MODEL WITH AN IMAGE CAPTURING APPARATUS

BACKGROUND OF THE INVENTION

Field of the Invention

The present invention relates to an image processing apparatus, an information processing method and a program.

Description of the Related Art

In a recent technique, images are simultaneously captured from multiple points of view by capturing apparatuses such as cameras located at different positions and a virtual viewpoint image is generated using the images captured from the multiple points of view. The virtual viewpoint image is an image which appears to be viewed from a virtually set point of view. According to the technique of generating a virtual viewpoint image from the images from multiple points of view, for example, highlights of soccer and basketball can be viewed from various angles. A virtual viewpoint image based on images from multiple points of view can be generated by performing processing such as foreground/background separation, three-dimensional model generation and rendering based on, for example, images captured by multiple cameras.

Japanese Patent Application Laid-Open No. 2014-215828 discloses a technique of generating and displaying a virtual viewpoint image corresponding to any specification by using the images of the same range surrounded by multiple capturing apparatuses.

In the technique of generating a virtual viewpoint image, a three-dimensional model of a stadium having a field as a background is generated and then images are projected to the model so as to generate a background in the virtual viewpoint image. In order to project images to the model of the background of a virtual viewpoint image generated from multiple images captured by capturing apparatuses from different points of view, the images captured by the capturing apparatuses are first subjected to, for example, projective transformation and then are composited. Thereafter, the composite image generated after the projective transformation can be projected to the model of the background.

However, processing for projecting images to a model (for example, processing for projective transformation on images captured by capturing apparatuses, or processing for compositing the captured images of the capturing apparatuses after projective transformation) requires many hardware resources (such as memories) and the undertaking of many separate operations. Thus, a technique for reducing the load of this processing is desired.

SUMMARY OF THE INVENTION

The present invention has been devised in consideration of the above-mentioned statements. According to one aspect of the present invention, there is provided an information processing apparatus including: a capturing information obtaining unit configured to obtain capturing information on a plurality of capturing apparatuses for capturing images in a plurality of directions; a model information obtaining unit configured to obtain model information on a background shape model indicating the three-dimensional shape of the background of a virtual viewpoint image that is generated by an image generating unit using the images captured by the capturing apparatuses; and an information generating unit configured to generate related information that associates at least one of the capturing apparatuses with a partial region of the background shape model, based on the capturing information obtained by the capturing information obtaining unit and the model information obtained by the model information obtaining unit, wherein the related information is used to determine which one of the capturing apparatuses is to capture the image used by the image generating unit to determine a pixel value corresponding to the partial region in the virtual viewpoint image.

Further features of the present invention will become apparent from the following description of exemplary embodiments with reference to the attached drawings.

BRIEF DESCRIPTION OF THE DRAWINGS

FIG. 4 is a flowchart of an example of preprocessing.

FIG. 10 is an explanatory drawing illustrating an example of a cutout image.

FIG. 19 illustrates an example in which the capturing apparatuses lined up according to a distance from the reference capturing apparatus.

DESCRIPTION OF THE EMBODIMENTS

Preferred embodiments of the present invention will now be described in detail in accordance with the accompanying drawings.

First Embodiment

Figure 1:
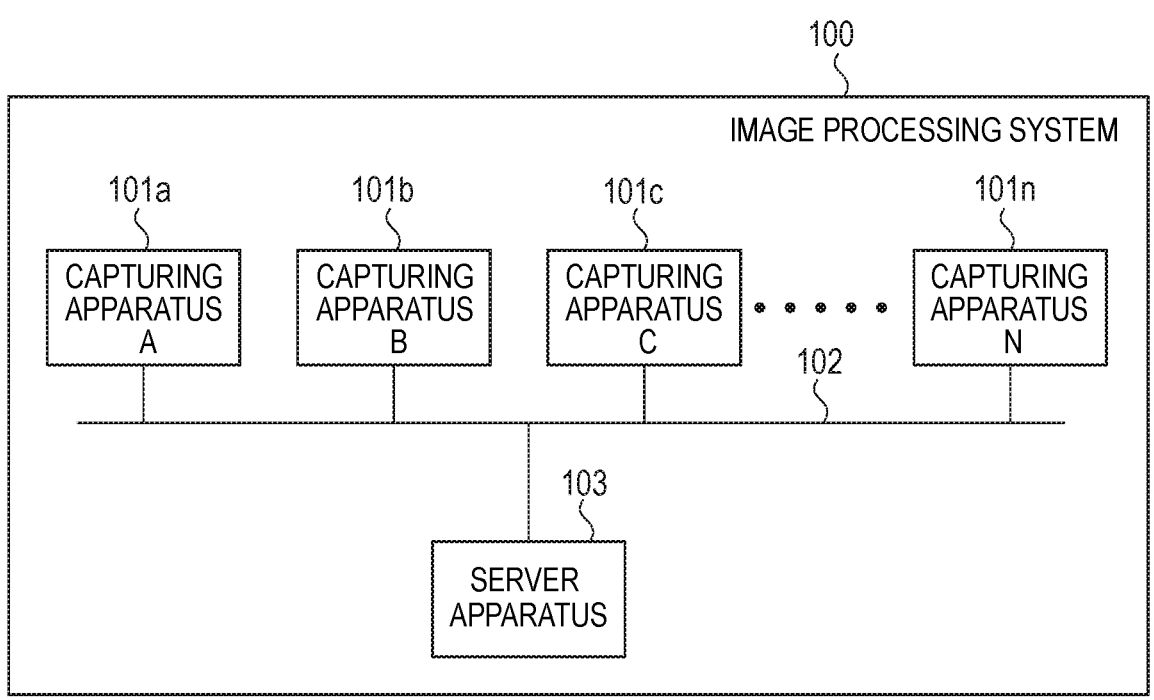
FIG. 1 illustrates an example of the system configuration of an image processing system.

FIG. 1 illustrates an example of the system configuration of an image processing system 100 that generates a virtual viewpoint image. The image processing system 100 is a system that captures images used for generating a virtual viewpoint image and generates the virtual viewpoint image from the captured images. The image processing system 100 includes capturing apparatuses 101a to 101n and a server apparatus 103. The capturing apparatuses 101a to 101n and the server apparatus 103 are connected via a communication line 102 so as to communicate with one another.

The capturing apparatuses 101a to 101n are capturing apparatuses such as network cameras having a communication function. Hereinafter, the capturing apparatuses 101a to 101n will be collectively referred to as capturing apparatuses 101. In the present embodiment, the 14 capturing apparatuses 101 are provided. The number of capturing apparatuses may be 13 or fewer (and more than one), or 15 or more. In the present embodiment, the capturing apparatuses 101a to 101n are disposed in a stadium. The capturing apparatuses may be disposed in another location, e.g., a concert venue. The server apparatus 103 is an information processing apparatus, e.g., a personal computer, a server apparatus, or a tablet. The server apparatus 103 collects images captured by the capturing apparatuses 101a to 101n and generates a virtual viewpoint image based on the collected images. The communication line 102 is, for example, an Ethernet communication line. The server apparatus 103 may include a plurality of apparatuses.

Figure 2A:
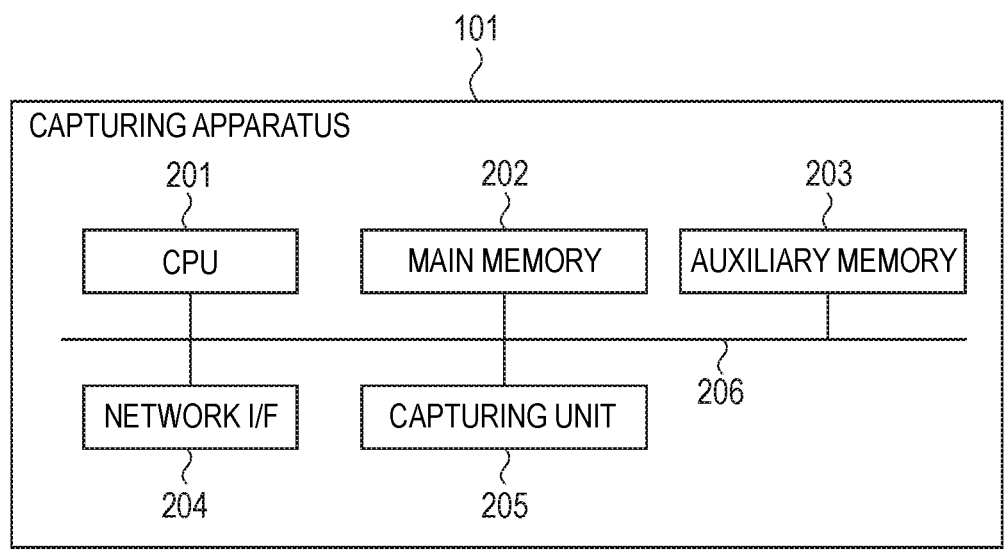
FIGS. 2A and 2B illustrate an example of the hardware configuration of a capturing apparatus.

FIG. 2A illustrates an example of the hardware configuration of each of the capturing apparatuses 101.

The capturing apparatus 101 includes a CPU 201, a main memory 202, an auxiliary memory 203, a network I/F 204 and a capturing unit 205. The elements are connected via a system bus 206 so as to communicate with one another.

The CPU 201 is a central processing unit that controls the capturing apparatus 101. The main memory 202 is a memory that acts as a work area for the CPU 201 or a temporary data storage region. The main memory 202 is placed using a storage medium, e.g., random access memory (RAM). The auxiliary memory 203 is a memory for storing various programs, various kinds of setting information, various kinds of image data and camera parameter information. The auxiliary memory 203 is placed using storage media such as a read-only memory (ROM), a hard disk drive (HDD) and a solid-state drive (SSD).

The network I/F 204 is an interface used for communications with an external apparatus, e.g., the server apparatus 103 through the communication line 102. The capturing unit 205 is a capturing unit that captures an image around the apparatus. The capturing unit 205 includes a capturing element, e.g., a CMOS sensor or a CCD sensor and a lens.

The CPU 201 performs processing according to a program stored in the auxiliary memory 203, enabling the function of the capturing apparatus 101, which will be discussed with reference to FIGS. 2B and 11 and the processing of the capturing apparatus 101 in a flowchart which will be discussed with reference to FIGS. 8 and 14.

Figure 2B:
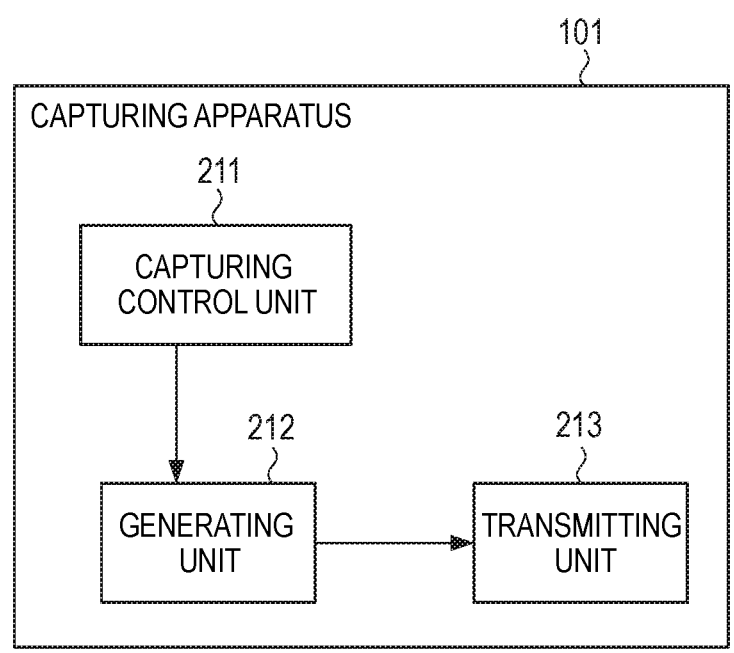

FIG. 2B illustrates an example of the functional configuration of each of the capturing apparatuses 101.

The capturing apparatus 101 includes a capturing control unit 211, a generating unit 212 and a transmitting unit 213.

The capturing control unit 211 controls the capturing unit 205 and converts an optically captured image into digital data by using the lens or the capturing element in the capturing unit 205. The generating unit 212 separates a foreground and a background from the image captured by the capturing control unit 211 and generates a background image without a foreground image. The transmitting unit 213 transmits data on the background image generated by the generating unit 212, to the server apparatus 103 through the communication line 102. At least part of the functional configuration in FIG. 2B may be implemented by hardware. Examples of the hardware include an application specific integrated circuit (ASIC), a field programmable gate array (FPGA) and a graphics processing unit (GPU).

Figure 3A:
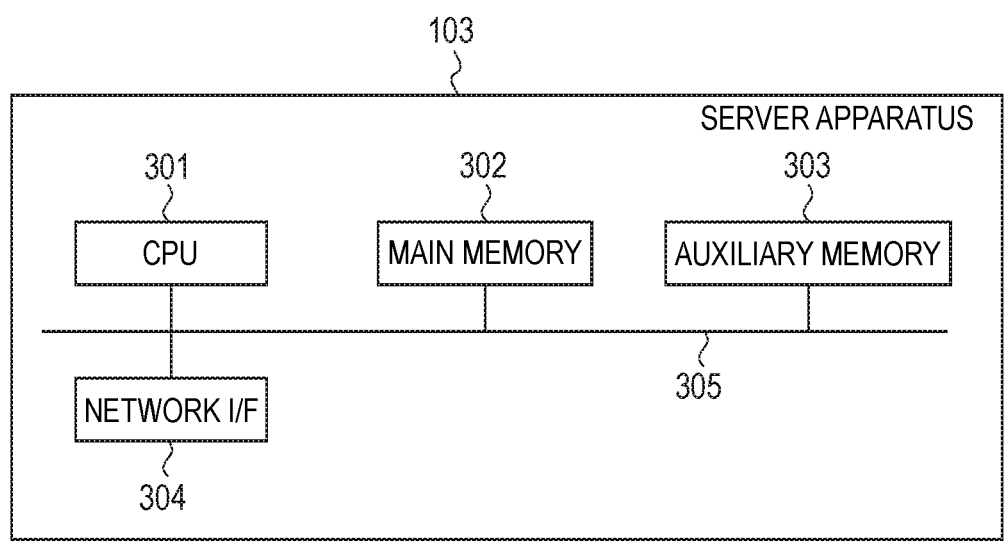
FIGS. 3A and 3B illustrate an example of the hardware configuration of a server apparatus.

FIG. 3A illustrates an example of the hardware configuration of the server apparatus 103.

The server apparatus 103 includes a CPU 301, a main memory 302, an auxiliary memory 303 and a network I/F 304. The elements are connected via a system bus 305 so as to communicate with one another.

The CPU 301 is a central processing unit that controls the server apparatus 103. The main memory 302 is a memory that acts as a work area for the CPU 301 or a temporary data storage region. The main memory 302 is placed using a storage medium, e.g., RAM. The auxiliary memory 303 is a memory for storing various programs, various kinds of setting information and various kinds of image data. The auxiliary memory 303 is placed using a storage medium, e.g., ROM, HDD, or SSD. The network I/F 304 is an interface used for communications with an external apparatus, e.g., the capturing apparatus 101 through the communication line 102.

The CPU 301 performs processing according to a program stored in the auxiliary memory 303, enabling the function of the server apparatus 103, which will be discussed with reference to FIGS. 3B and 12, and the processing of the server apparatus 103 in flowcharts which will be discussed with reference to FIGS. 8 and 14. The CPU 301 performs processing according to a program stored in the auxiliary memory 303, enabling the processing of flowcharts which will be discussed with reference to FIGS. 4, 13, 15, 21, 22 and 24.

Figure 3B:
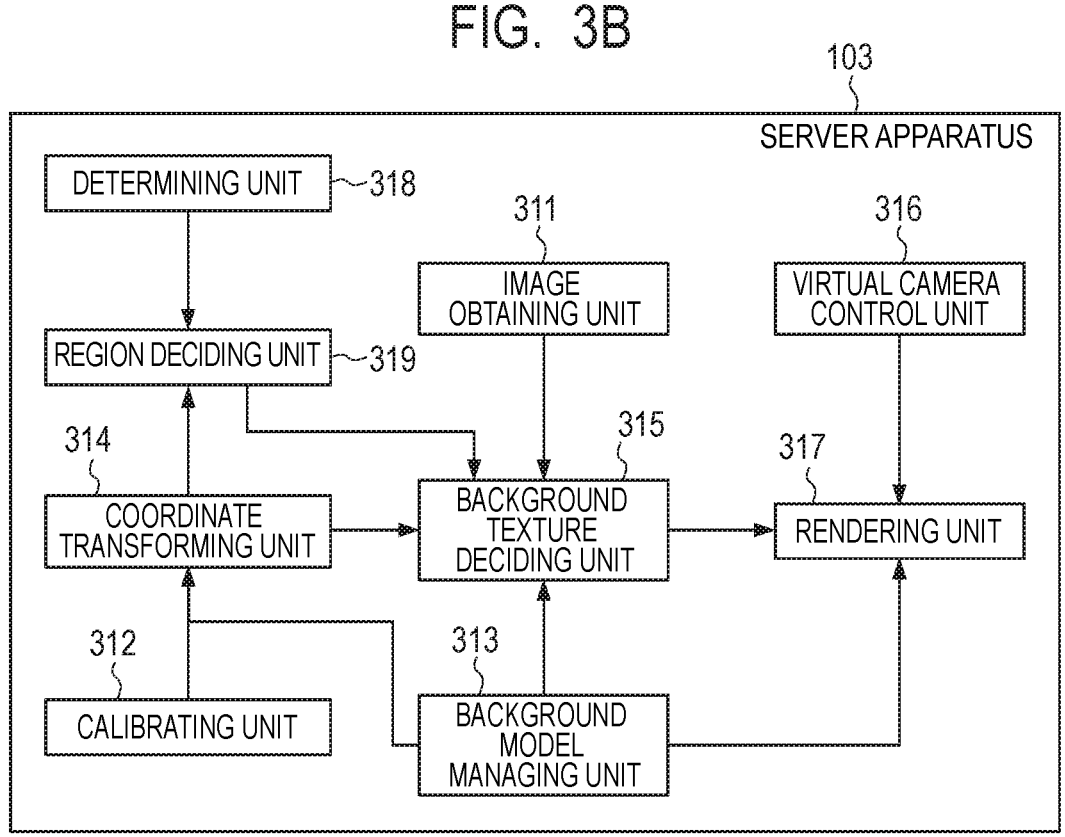

FIG. 3B illustrates an example of the functional configuration of the server apparatus 103.

The server apparatus 103 includes an image obtaining unit 311, a calibrating unit 312, a background model managing unit 313, a coordinate transforming unit 314, a background texture deciding unit 315, a virtual camera control unit 316 and a rendering unit 317.

The image obtaining unit 311 obtains images captured by the capturing apparatuses 101, the images being transmitted from the capturing apparatuses 101 through the communication line 102. The image obtaining unit 311 transmits the captured images to the background texture deciding unit 315.

The calibrating unit 312 controls camera parameters that are capturing information on the capturing apparatuses 101. The camera parameters are parameters about the capturing apparatuses. The camera parameters may include an external parameter about the position and orientation (direction) of the capturing apparatus and an internal parameter about a focal length or a pixel spacing. The camera parameter may be information for specifying a capturing region. The camera parameter may be only one of the external parameter and the internal parameter or include another parameter. The calibrating unit 312 transmits, for example, an instruction to change the camera parameter to the capturing apparatus 101 through the communication line 102. The capturing apparatus 101 changes its camera parameter in response to the transmitted instruction. Moreover, the calibrating unit 312 can receive, for example, information on the camera parameter from the capturing apparatus 101 through the communication line 102. The calibrating unit 312 stores and manages, for example, the camera parameters of the capturing apparatuses 101 in the auxiliary memory 303. The calibrating unit 312 transmits the managed camera parameters of the capturing apparatuses 101 to the coordinate transforming unit 314.

The background model managing unit 313 manages model information (hereinafter will be referred to as background model data). The model information is defined closely to a three-dimensional mesh model of a structure, e.g., a stadium illustrated as a background of a virtual viewpoint image generated by the image processing system 100. The background model data indicates, for example, the positions of meshes constituting a background model. The background model data may have any data structure, e.g., a structure of a three-dimensional shape including points, lines and faces. The background model data is stored in advance in the auxiliary memory 303. The background model managing unit 313 transmits the managed background model data to the background texture deciding unit 315, the coordinate transforming unit 314 and the rendering unit 317. In the present embodiment, the background model managing unit 313 manages the coordinates of the background model by using a predetermined world coordinate system.

The coordinate transforming unit 314 transforms a region in the background model in the world coordinate system to a region (a region in a camera coordinate system) in an image captured by the capturing apparatus 101, based on the camera parameter transmitted from the calibrating unit 312. Moreover, the coordinate transforming unit 314 transforms a region in the camera coordinate system in an image captured by the capturing apparatus 101 to a region in the background model in the world coordinate system, based on the camera parameter transmitted from the calibrating unit 312. The camera coordinate system is a coordinate system based on the capturing apparatus. The coordinate transforming unit 314 may specify the correspondence (for example, a transformation parameter between the coordinate systems) between the world coordinate system and the camera coordinate system in each of the capturing apparatuses 101. In this case, the coordinate transforming unit 314 transmits information on the specified correspondence to the background texture deciding unit 315. Thereafter, the background texture deciding unit 315 transforms a region in the background model in the world coordinate system to a region in the camera coordinate system in an image captured by the capturing apparatus 101, based on the transmitted correspondence information. Furthermore, the background texture deciding unit 315 transforms a region in the camera coordinate system in an image captured by the capturing apparatus 101, to a region in the background model in the world coordinate system based on the transmitted correspondence information.

The background texture deciding unit 315 decides an image to be projected to each partial region (mesh) of the background model, based on the images obtained by the image obtaining unit 311.

The virtual camera control unit 316 manages information on virtual cameras and controls the camera parameters of the virtual cameras based on user operations through the operation unit of the server apparatus 103. The virtual camera is a virtual capturing apparatus simulated to be located at a specified position. The information on the virtual cameras is stored in advance in the auxiliary memory 303. The virtual camera control unit 316 transmits the information on the virtual cameras to the rendering unit 317.

The rendering unit 317 projects the image decided by the background texture deciding unit 315 to each mesh of the background model transmitted from the background model managing unit 313. Thereafter, the rendering unit 317 renders the image as a two-dimensional image based on the camera parameters of the virtual cameras from the virtual camera control unit 316. This allows the rendering unit 317 to generate an image from any specified point of view based on a user instruction through the operation unit of the server apparatus 103.

A determining unit 318 selects an image to be used for generating a virtual viewpoint image from among images obtained by the image obtaining unit 311. Information stored in advance in the auxiliary memory 303 indicates that specific images are not used for generating a virtual viewpoint image, the specific images including, for example, an out-of-focus image, an image at improper exposure (for example, out of a predetermined range) and an image captured by a specified capturing apparatus. For example, based on the information, the determining unit 318 selects an image used for generating a virtual viewpoint image from among images obtained by the image obtaining unit 311. In the present embodiment, it is assumed that information stored in the auxiliary memory 303 indicates that an image captured by specified one of the capturing apparatuses 101 is not used for generating a virtual viewpoint image. The image processing system 100 may deal with a capturing apparatus, that captures an image determined by the determining unit 318 not to be used for generating a virtual viewpoint image, as being not included in the image processing system 100.

The region deciding unit 319 decides a region in an image determined by the determining unit 318 to be used for generating a virtual viewpoint image. An image of the decided region is determined by the background texture deciding unit 315 to be projected to the background model. At least part of the functional configuration in FIG. 3B may be implemented by hardware. Examples of the hardware include an ASIC, an FPGA and a GPU.

FIG. 4 is a flowchart of an example of preprocessing performed by the image processing system 100 before a virtual viewpoint image is generated. The processing in FIG. 4 allows the image processing system 100 to reduce the load of projecting an image to the background model when a virtual viewpoint image is generated.

Figure 5:
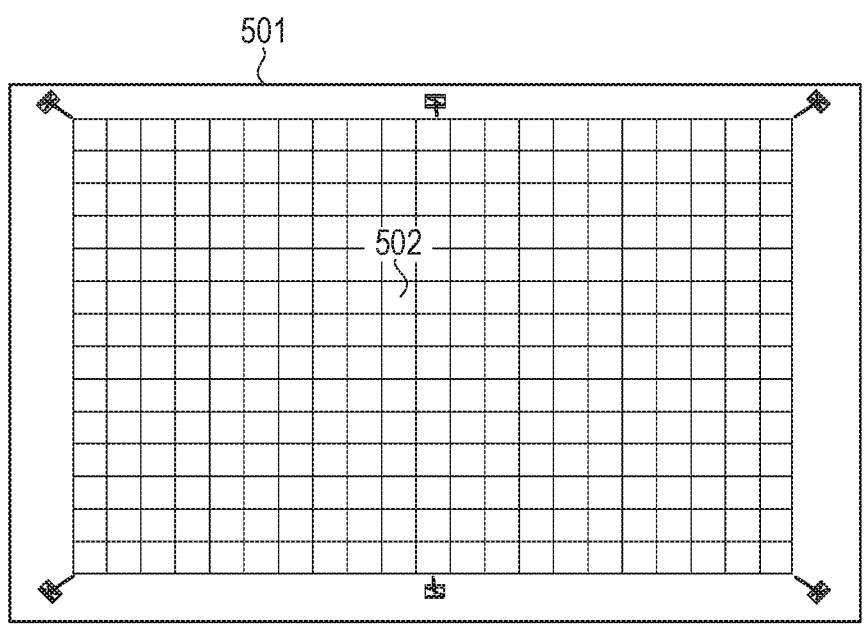
FIG. 5 is an explanatory drawing illustrating an example of a background model.

In S401, the background texture deciding unit 315 extracts a mesh constituting the background model from the background model data received from the background model managing unit 313. Each mesh of the background model is an example of a surface region formed on the surface of the background model. FIG. 5 is an explanatory drawing illustrating an example of the background model. A model 501 is a three-dimensional model of a stadium. A ground with meshes is illustrated as a field. In the present embodiment, the background model is a stadium model similar to the model 501. However, the background model may be a model of a concert venue or an auditorium. The background model data may include information on vertex coordinates or a normal line of a plane for each of the meshes constituting the ground. In the present embodiment, the background texture deciding unit 315 extracts a mesh 502 in the processing of S401 after the processing in FIG. 4 is started. In S401, a region on the surface of the background model may be partially extracted by a different unit from the mesh.

In S402, the background texture deciding unit 315 selects one of the capturing apparatuses 101. In the present embodiment, the background texture deciding unit 315 selects the capturing apparatus 101*a* in the processing of S402 after the processing in S401.

Figure 6:
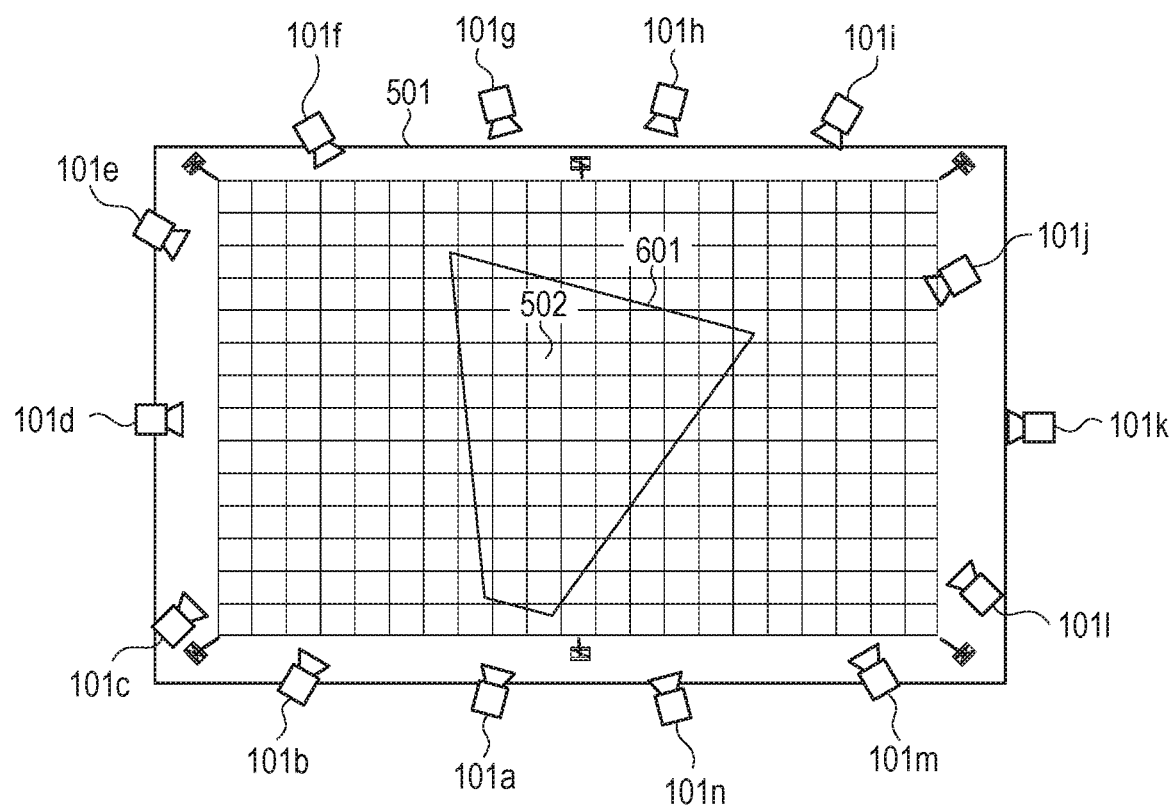
FIG. 6 is an explanatory drawing illustrating an example of the layout of the capturing apparatuses.

FIG. 6 is an explanatory drawing illustrating an example of the layout of the capturing apparatuses. The state of FIG. 6 illustrates the positional relationship between the model 501 indicating a stadium to be captured in the world coordinate system and the capturing apparatuses 101 disposed according to an actual layout in the world coordinate system. As indicated by the camera parameter of the capturing apparatus 101*a*, the camera parameter being managed by the calibrating unit 312, the capturing apparatus 101*a* is disposed at a position indicated in FIG. 6 and captures a region 601. The coordinate transforming unit 314 transforms the coordinates of the mesh 502 in the world coordinate system to coordinates in the camera coordinate system of the capturing apparatus 101*a*.

Figure 7:
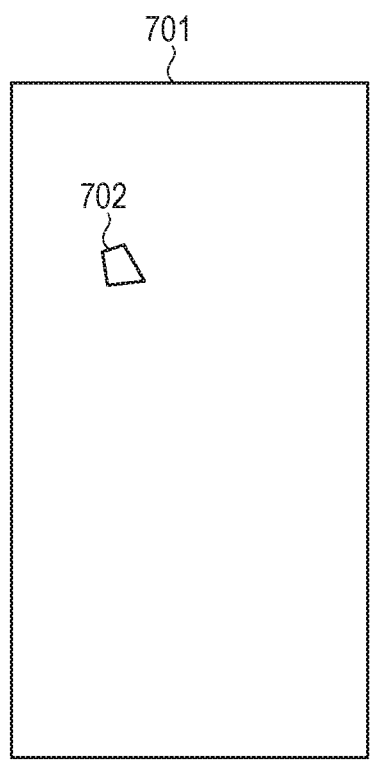
FIG. 7 is an explanatory drawing illustrating an example of coordinate transformation.

In S403, based on the camera parameter of the capturing apparatus 101*a*, the camera parameter being transmitted from the calibrating unit 312, the coordinate transforming unit 314 performs the following processing: The coordinate transforming unit 314 transforms the region of the mesh 502 extracted in S401 in the world coordinate system to a region in the camera coordinate system of the capturing apparatus 101*a*. The transformed region is a region for capturing a part corresponding to the mesh 502 in an image captured by the capturing apparatus 101*a*. In other words, the coordinate transforming unit 314 specifies a region for capturing a part corresponding to the mesh 502 in an image captured by each of the capturing apparatuses 101. Referring to FIG. 7, the region of the mesh 502 in the world coordinate system is transformed to the camera coordinate system of the capturing apparatus 101*a* as will be discussed below. A region 701 is the region of the overall image captured by the capturing apparatus 101*a* in the camera coordinate system of the capturing apparatus 101*a*. FIG. 7 illustrates that the coordinate transforming unit 314 has transformed the region of the mesh 502 to a region 702 in the camera coordinate system of the capturing apparatus 101*a*.

In S404, for all the capturing apparatuses 101, the coordinate transforming unit 314 determines whether the meshes extracted in S401 have been processed in S403. If the coordinate transforming unit 314 determines that the meshes extracted in S401 have been processed in S403 for all the capturing apparatuses 101, the process advances to the processing of S405. If the coordinate transforming unit 314 determines that the meshes extracted in S401 have not been processed in S403 for all the capturing apparatuses 101, the process advances to the processing of S402.

In S405, based on the regions of the meshes extracted in S401, the regions being transformed to the camera coordinate systems of the capturing apparatuses 101 in S403, the region deciding unit 319 performs the following processing: The region deciding unit 319 decides a region for capturing an image to be projected to the part of the mesh extracted in the background model in S401, from regions in images captured by the capturing apparatuses 101.

The region deciding unit 319 specifies a region contained in (not placed out of) an image captured by each of the capturing apparatuses 101, among from the regions of the meshes extracted in S401, the regions being transformed to the camera coordinate systems of the capturing apparatuses 101 in S403. The region deciding unit 319 selects one of the specified regions as a region for capturing an image to be projected to the part of the mesh extracted in the background model in S401. In other words, in the image processing system 100, the image of a selected region in an image captured by each of the capturing apparatuses 101 is projected to the part of the mesh extracted in S401.

The region deciding unit 319 specifies, for example, one of the regions transformed in S403 as a region first specified to be contained in an image captured by each of the capturing apparatuses 101. In other words, the region deciding unit 319 may select the specified region as a region for capturing an image to be projected to the part of the mesh extracted in S401.

After specifying, for example, one of the regions transformed in S403 as a region contained in an image captured by each of the capturing apparatuses 101, the region deciding unit 319 may perform the following processing: Specifically, the region deciding unit 319 may select, based on the area of each region (the number of pixels occupying an image), one of the selected regions as a region for capturing an image to be projected to the part of the mesh extracted in S401.

For example, the region deciding unit 319 specifies one of the regions transformed in S403 as a region contained in an image captured by each of the capturing apparatuses 101. Moreover, the region deciding unit 319 may select the largest region of the selected regions as a region for capturing an image to be projected to the part of the mesh extracted in S401. This processing allows the image processing system 100 to select the capturing apparatus that captures, with a maximum resolution, the part of the mesh extracted in S401, as a capturing apparatus for capturing an image to be projected to the part. Thus, the image processing system 100 can project a fine image with the meshes of the background model.

For example, the region deciding unit 319 specifies one of the regions transformed in S403 as a region contained in an image captured by each of the capturing apparatuses 101. Moreover, the region deciding unit 319 may select the smallest region of the selected regions as a region for capturing an image to be projected to the part of the mesh extracted in S401. The processing allows the image processing system 100 to minimize the size of an image projected to the meshes of the background model, thereby reducing the load of processing for projection. If the server apparatus 103 receives only the part of an image projected to the meshes of the background model from the capturing apparatus 101, the communication band of the communication line 102 can be saved. For example, the region deciding unit 319 may specify two or more of regions contained in images captured by the capturing apparatuses 101, as regions for capturing images to be projected to the parts of the meshes extracted in S401. In this case, the image processing system 100 may project an image, which is obtained by averaging the images for the specified regions, to the corresponding mesh during the generation of a virtual viewpoint image.

In this way, the region deciding unit 319 in S405 decides which one of the capturing apparatuses is to capture the image and which part of the image is to be projected to the target mesh. Moreover, the region deciding unit 319 generates information on the results (hereinafter will be referred to as region information). The region information associates at least one of the capturing apparatuses 101 with the mesh of the background model. The region information is used when the rendering unit 317 decides which one of the capturing apparatuses is to capture the image used for determining a pixel value corresponding to the target mesh in the virtual viewpoint image. Furthermore, the region information indicates a part corresponding to the mesh in the image captured by the capturing apparatus associated with the mesh. Hereinafter, the region selected in S405 will be referred to as a texture region.

In S406, the region deciding unit 319 determines whether the processing of S402 to S405 has been completed for all the meshes in the background model. If the region deciding unit 319 determines that the processing of S402 to S405 has been completed for all the meshes in the background model, the process advance to S407. If the region deciding unit 319 determines that the processing of S402 to S405 has not been completed for all the meshes in the background model, the process advances to the processing of S401.

In S407, the background texture deciding unit 315 transmits the region information to the rendering unit 317, the region information indicating the texture region selected for each mesh in the background model in S405.

At the completion of the processing in FIG. 4, the generation of an image to be projected to the background model is prepared.

Figure 8:
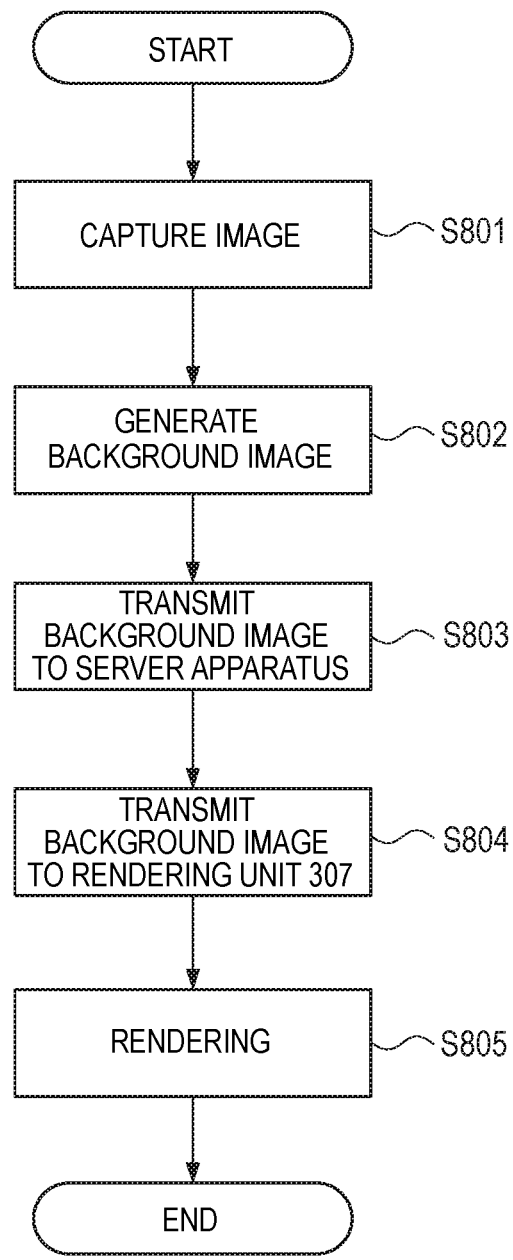
FIG. 8 is a flowchart of an example of background generation for a virtual viewpoint image.

FIG. 8 is a flowchart of an example of background generation for a virtual viewpoint image.

In S801, the capturing control unit 211 in each of the capturing apparatuses 101 captures an image of a subject.

Figure 9:
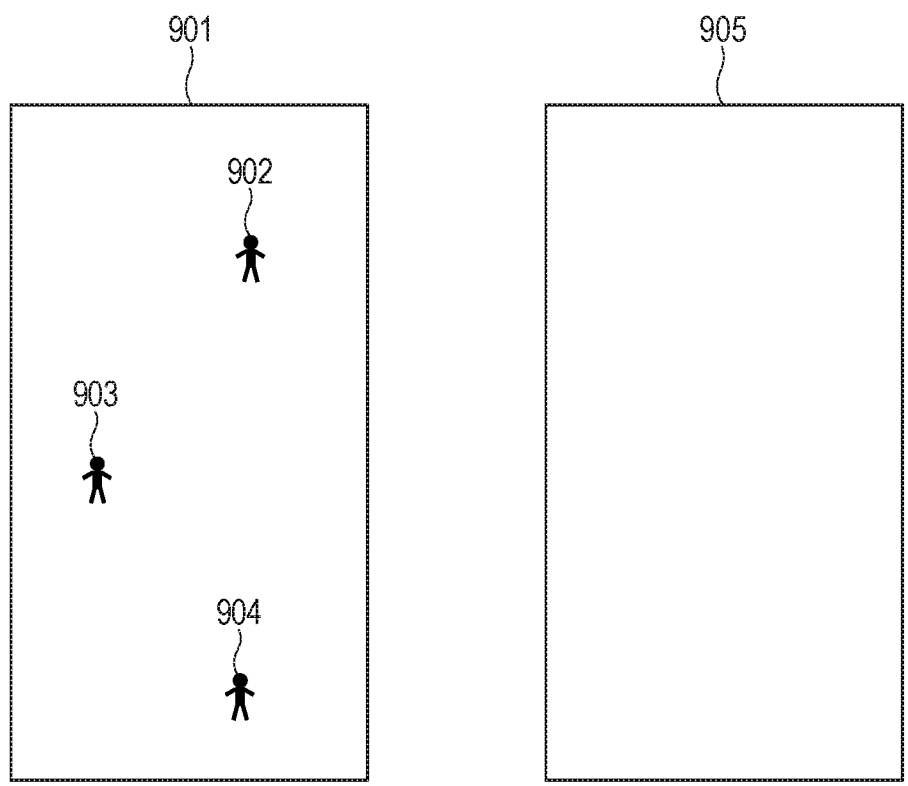
FIG. 9 illustrates an example of a state captured by the capturing apparatus.

FIG. 9 illustrates an example of a state captured by the capturing apparatus 101. An image 901 is an image captured by the capturing apparatus 101a. The image 901 includes persons 902, 903 and 904.

In S802, the generating unit 212 in each of the capturing apparatuses 101 separates the foreground and the background of the image captured in S801 and generates a background image without the foreground. For example, the foreground is a moving object and the background is an object other than the foreground, e.g., the ground or a structure. In the example of FIG. 9, the generating unit 212 separates the persons 902, 903 and 904 as a foreground from the image 901 and generates a background 905. The generating unit 212 separates the foreground and the background by using, for example, a method of defining the foreground that is an object with a motion of a threshold value or more in the time direction.

In S803, the transmitting unit 213 in each of the capturing apparatuses 101 transmits the background image generated in S802 to the server apparatus 103 through the communication line 102.

In S804, based on the background image transmitted by each of the capturing apparatus 101 in S803, the background texture deciding unit 315 decides an image to be projected to each mesh of the background model of the virtual viewpoint image. In the present embodiment, the background texture deciding unit 315 decides that each of the background images transmitted in S803 is an image including an image to be projected to each mesh of the background model, and then transmits the background images to the rendering unit 317.

In S805, from the background images transmitted in S804, the rendering unit 317 extracts the image of a region indicated by the region information generated in the processing of FIG. 4. Then, the rendering unit 317 projects the extracted image to the corresponding mesh of the background model. The rendering unit 317 extracts the region to be projected to each mesh of the background model from the background image based on, for example, the region information. Then, the rendering unit 317 projects the image of the extracted region to the corresponding mesh of the background model. This enables the projection of the corresponding image to each mesh of the background model.

Moreover, based on the transmitted camera parameters of the virtual cameras from the virtual camera control unit 316, the rendering unit 317 generates an image of the background model viewed from the virtual camera. Furthermore, the rendering unit 317 obtains a foreground model indicating the three-dimensional shape of the foreground and the texture of the model, and generates a foreground image viewed from the virtual camera. The rendering unit 317 then synthesizes the foreground image and the background image so as to generate a virtual viewpoint image. If a virtual viewpoint image is generated for a moving image including multiple frames, a plurality of foreground models and a single background model for the frames may be used, the foreground models indicating the shapes of foregrounds in the frames. Alternatively, a plurality of background models may be used for the respective frames.

In the present embodiment, the image processing system 100 in the processing of FIG. 4 decides in advance a region for capturing an image to be projected to each mesh of the background model, in an image captured by each of the capturing apparatuses 101. Then, the image processing system 100 projects an image captured in the decided region to each mesh of the background model, thereby generating a virtual viewpoint image. In this way, the image processing system 100 projects an image captured in the predetermined region to each mesh of the background model. Thus, the image processing system 100 reduces the processing for synthesizing the captured images of the capturing apparatuses 101 after projective transformation. Moreover, the image processing system 100 can reduce the load of processing, for example, the usage rate of the memory of the main memory 302 or the CPU 301 as compared with the case where images captured by the capturing apparatuses 101 are synthesized after projective transformation and then the synthesized images are projected to the background model.

Furthermore, the image processing system 100 decides a region for capturing an image to be projected to each mesh of the background model. The image processing system 100 then projects the image of the region to each mesh of the background model from among the images captured by the capturing apparatuses 101 that gradually change with the passage of time. Thus, the image processing system 100 can reduce the load of processing, for example, the usage rate of the memory of the main memory 302 or the CPU 301 even in the case where the images captured by the capturing apparatuses 101 gradually change with the passage of time, the images being projected to the meshes of the background model.

Second Embodiment

The present embodiment will describe the processing of an image processing system 100 in the case where a background texture deciding unit 315 cuts out an image, which is to be projected to each mesh of a background model, from a background image and transmits the image to a rendering unit 317.

The system configuration of the image processing system 100 of the present embodiment is similar to that of the first embodiment. The hardware configurations and the functional configurations of capturing apparatuses 101 are similar to those of the first embodiment. The hardware configuration and the functional configuration of a server apparatus 103 are similar to those of the first embodiment.

Referring to FIGS. 4 and 8, differences between the processing of the image processing system 100 of the present embodiment and the first embodiment will be discussed below:

In S804 of the present embodiment, from among background images transmitted by the capturing apparatuses 101 in S803, the background texture deciding unit 315 cuts out the image of a region indicated by region information on regions decided in the processing of FIG. 4. Then, the background texture deciding unit 315 decides the cutout image as an image to be projected to each mesh of the background model of a virtual viewpoint image. The background texture deciding unit 315 transmits the decided image to the rendering unit 317.

FIG. 10 is an explanatory drawing illustrating an example of an image cut out by the background texture deciding unit 315. A region 1001 is a rectangular region including a region 702 for a mesh 502 in an image captured by a capturing apparatus 101a (in the camera coordinate system of the capturing apparatus 101a), the region 702 being determined in processing to S405. The capturing apparatus 101a is determined by a determining unit 318 as a capturing apparatus for capturing an image to be projected to the mesh 502. The background texture deciding unit 315 specifies a rectangular region, in which the region 702 is inscribed, from the region 701 and decides a specified region 1001 as a region to be cut out. In the example of FIG. 10, the background texture deciding unit 315 in S804 cuts out the range of the region 1001 in the background image generated from the image captured by the capturing apparatus 101a, and obtains a cutout image 1002.

The rendering unit 317 in S815 projects the image of a region to the corresponding mesh of the background model. The region includes an image captured to be projected to a mesh included in the image transmitted in S804. Thereafter, the rendering unit 317 renders the image based on the camera parameters of virtual cameras specified from a virtual camera control unit 316, and generates a virtual viewpoint image.

As described above, in the present embodiment, the background texture deciding unit 315 cuts out the image to be projected to the mesh from the background image and transmits the cutout image to the rendering unit 317. Thus, the image processing system 100 can reduce the size of data transmitted from the background texture deciding unit 315 to the rendering unit 317 as compared with the transmission of the overall background image.

Third Embodiment

The present embodiment will describe the processing of an image processing system 100 in the case where capturing apparatuses 101 each cut out the image of a region corresponding to each mesh of a background model from the background image of an image captured by each of the capturing apparatuses 101 and then the capturing apparatus 101 transmits the cutout image to a server apparatus 103.

The system configuration of the image processing system 100 of the present embodiment is similar to that of the first embodiment. The hardware configurations of the capturing apparatuses 101 are similar to those of the first embodiment. The hardware configuration of the server apparatus 103 is similar to that of the first embodiment.

Figure 11:
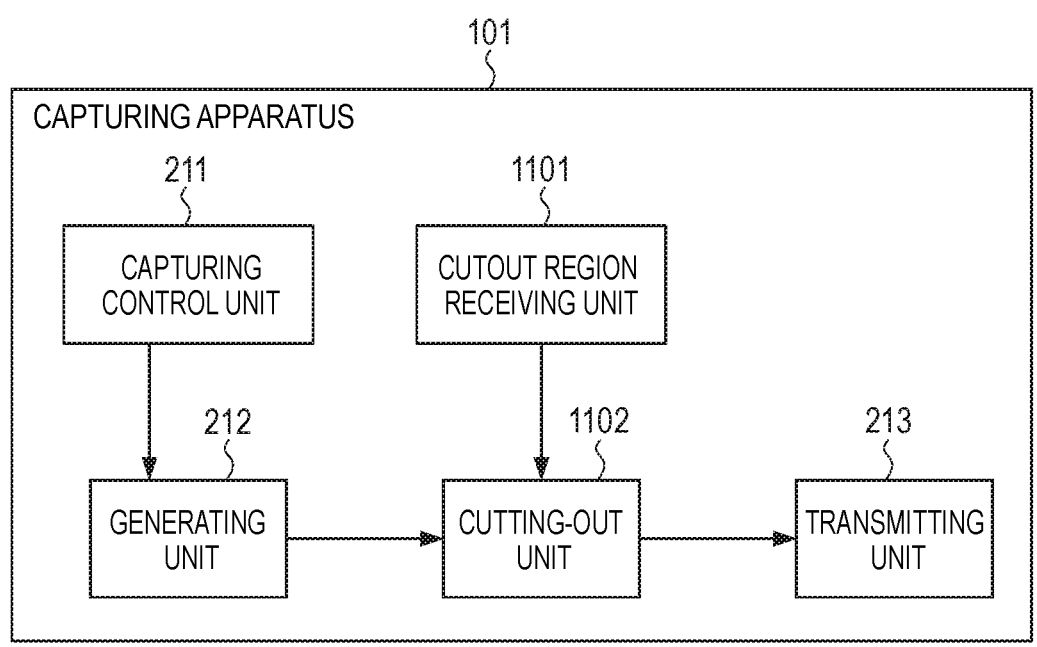
FIG. 11 illustrates an example of the functional configuration of the capturing apparatus.

FIG. 11 illustrates an example of the functional configuration of each of the capturing apparatuses 101.

The capturing apparatus 101 of the present embodiment is different from FIG. 2B in the provision of a cutout region receiving unit 1101 and a cutting-out unit 1102.

The cutout region receiving unit 1101 receives, from the server apparatus 103, information on a region corresponding to each mesh of the background model in an image captured by the capturing apparatus 101. In the present embodiment, a background texture deciding unit 315 in S407 transmits region information to the capturing apparatus 101 that captures an image of the region indicated by the region information. The cutout region receiving unit 1101 receives the transmitted region information.

The cutting-out unit 1102 cuts out an image from the background image generated by a generating unit 212, based on the region information received by the cutout region receiving unit 1101. The cutting-out unit 1102 transmits the cutout image to the server apparatus 103 through a transmitting unit 213.

Figure 12:
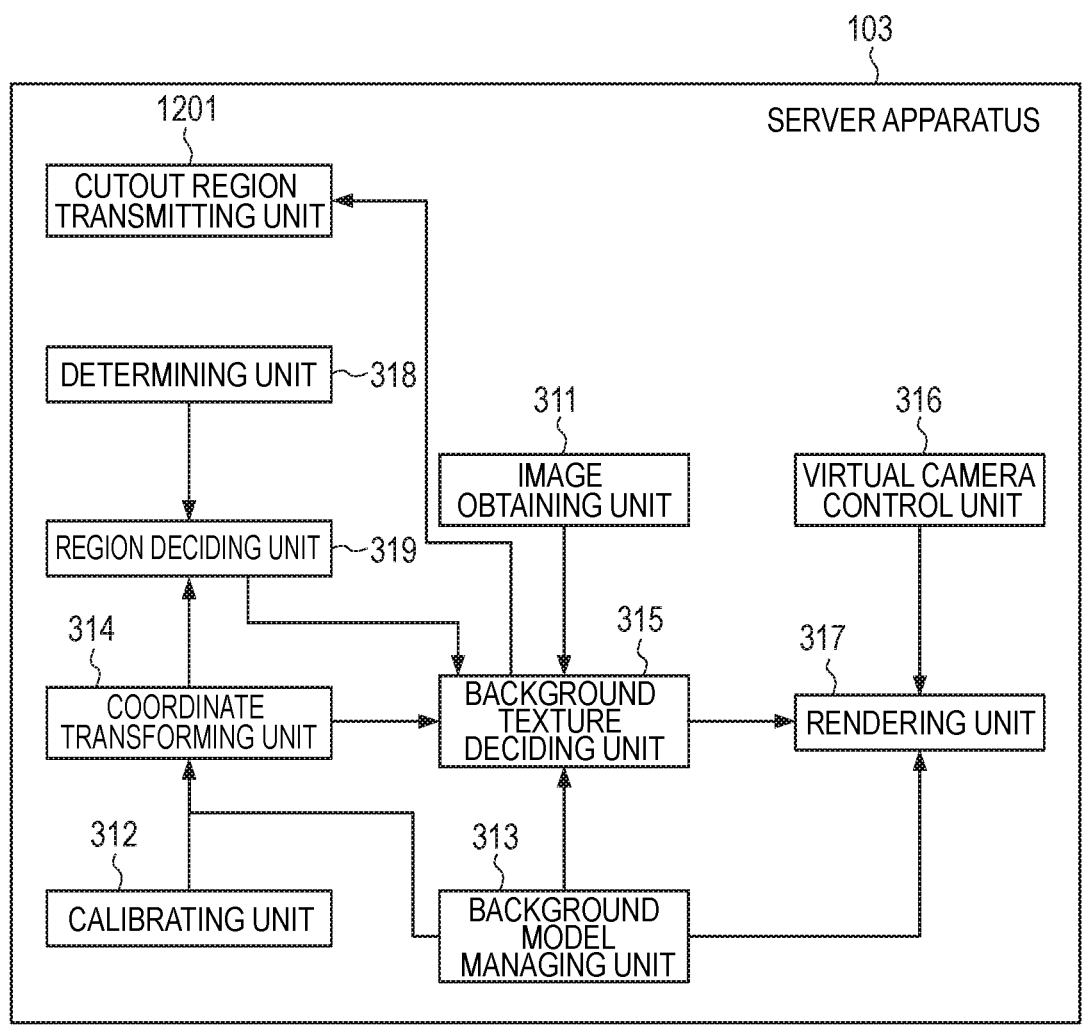
FIG. 12 illustrates an example of the functional configuration of the server apparatus.

FIG. 12 illustrates an example of the functional configuration of the server apparatus 103 according to the present embodiment.

The server apparatus 103 of the present embodiment includes an image obtaining unit 311, a calibrating unit 312, a background model managing unit 313, a coordinate transforming unit 314, the background texture deciding unit 315, a virtual camera control unit 316, a rendering unit 317, a determining unit 318 and a region deciding unit 319. The server apparatus 103 further includes a cutout region transmitting unit 1201.

The calibrating unit 312, the background model managing unit 313, the coordinate transforming unit 314, the virtual camera control unit 316, the determining unit 318 and the region deciding unit 319 are similar to those of FIG. 3B.

The background texture deciding unit 315 has the function of transmitting the region information to the capturing apparatuses 101 through the cutout region transmitting unit 1201 in addition to the same function as in the first embodiment.

The cutout region transmitting unit 1201 transmits the region information received from the background texture deciding unit 315, to the capturing apparatuses 101 through a communication line 102.

The image obtaining unit 311 receives an image cut out from the background image, which is received from each of the capturing apparatuses 101, through the communication line 102. The image obtaining unit 311 then transmits the image to the rendering unit 317.

The rendering unit 317 projects the cutout image, which is received from the image obtaining unit 311, to each mesh of the background model by using the region information received from the background texture deciding unit 315. The rendering unit 317 then generates a virtual viewpoint image.

Figure 13:
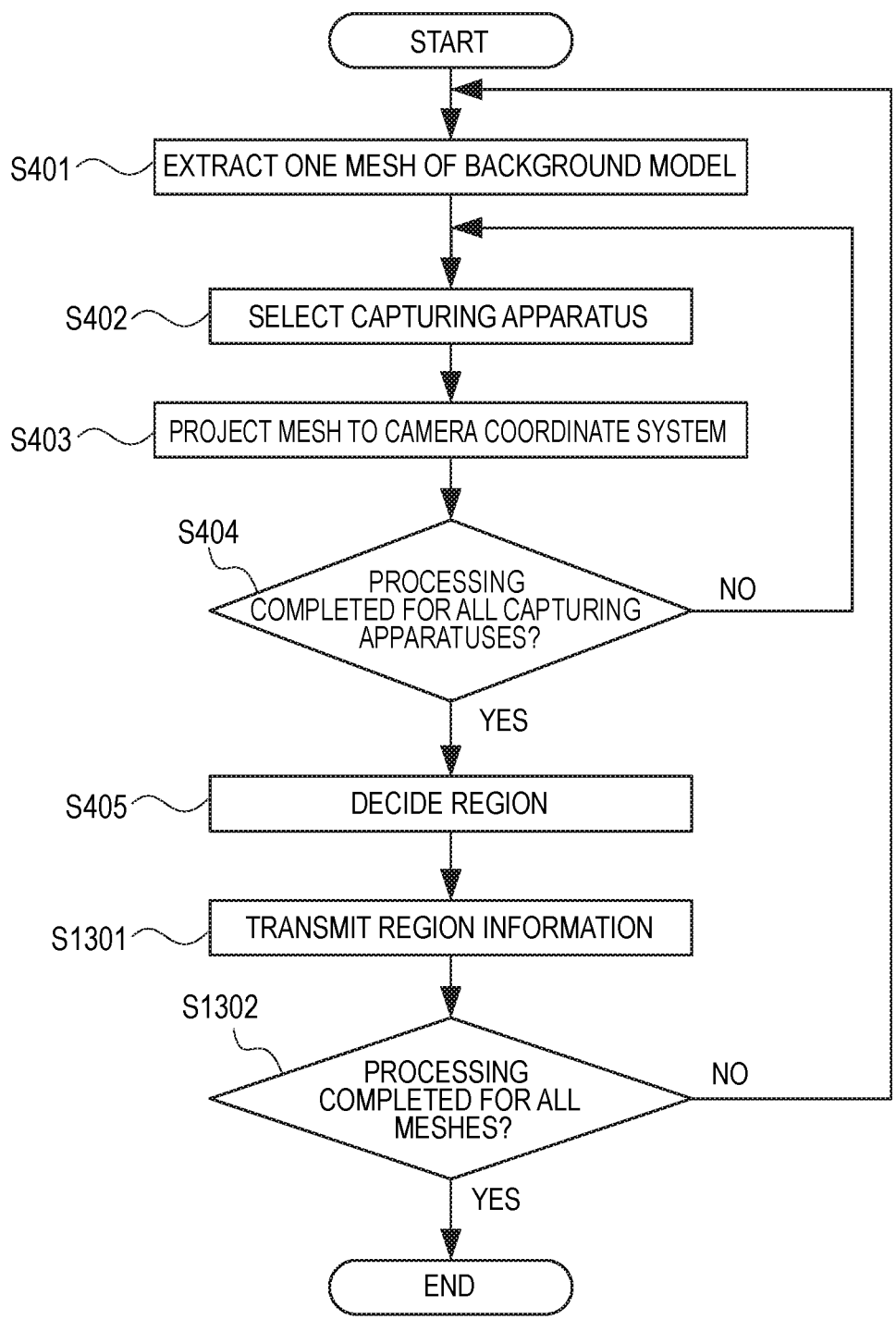
FIG. 13 is a flowchart of an example of preprocessing.

FIG. 13 is a flowchart of an example of preprocessing performed by the image processing system 100 of the present embodiment before the virtual viewpoint image is generated.

The processing of S401 to S405 in FIG. 13 is similar to that of FIG. 4. Regarding the processing of FIG. 13, differences from FIG. 4 will be discussed below.

In S1301, the cutout region transmitting unit 1201 receives the region information generated by the background texture deciding unit 315 and transmits the received region information to the corresponding capturing apparatus 101 through the communication line 102. As in the example of FIG. 7, if the region deciding unit 319 selects a region 702 in S405, the background texture deciding unit 315 decides the region 1001 in FIG. 10 as a target cutout region and transmits region information on the decided region to the cutout region transmitting unit 1201. The cutout region transmitting unit 1201 then transmits the region information on the region 1001 to a capturing apparatus 101a that captures an image of the region 1001.

Figure 14:
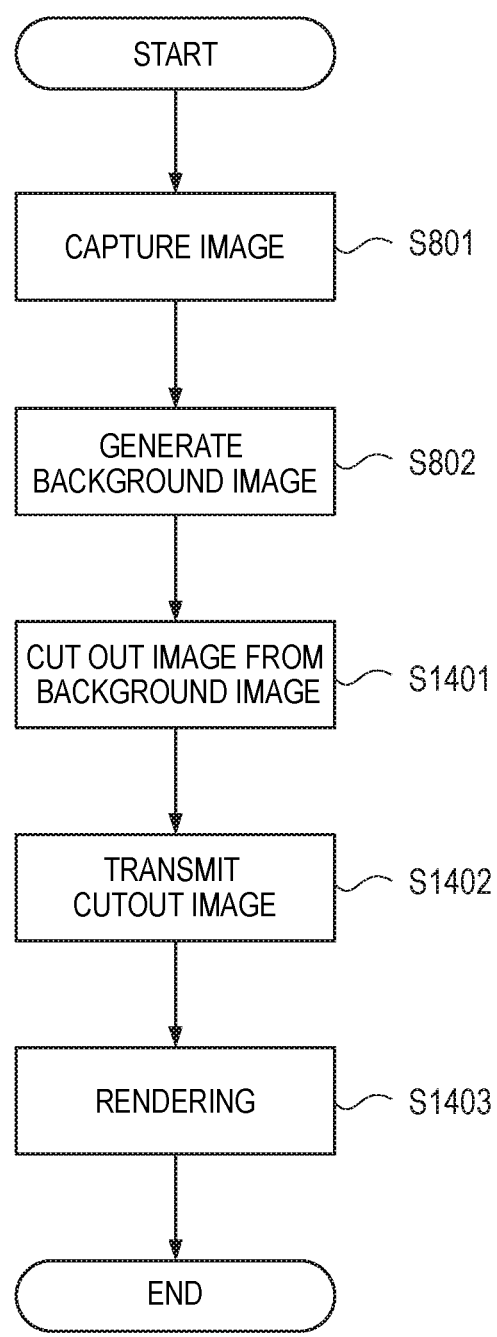
FIG. 14 is a flowchart of an example of background generation.

FIG. 14 is a flowchart of an example of background generation for the virtual viewpoint image by the image processing system 100 of the present embodiment. The processing of S801 and S802 in FIG. 14 is similar to that of FIG. 8. Regarding the processing of FIG. 14, differences from FIG. 8 will be discussed below.

In S1401, the cutting-out unit 1102 cuts out the region indicated by the region information received by the cutout region receiving unit 1101, from the background image generated in S802. If the region information indicates the region 1001, the cutting-out unit 1102 cuts out the range of the region 1001 from the background image and generates an image 1002.

In S1402, the transmitting unit 213 transmits the image cut out from the background image by the cutting-out unit 1102 in S1401, to the server apparatus 103.

In S1403, the rendering unit 317 projects the transmitted image in S1402 to the corresponding mesh of the background model. Thereafter, the rendering unit 317 renders the image based on the camera parameters of virtual cameras specified from a virtual camera control unit 316, and generates a virtual viewpoint image.

In the present embodiment, the capturing apparatuses 101 each perform the processing of cutting out an image to be projected to the mesh of the background model from the background image. In the second embodiment, the processing is performed by the server apparatus 103. In other words, the server apparatus 103 receives a partial image corresponding to a mesh of the background model, that is, a partial image of an image captured by the capturing apparatus associated with the mesh. Thus, the image processing system 100 can reduce the load of processing of the server apparatus 103. Moreover, the capturing apparatus 101 transmits a cutout image to the server apparatus 103 instead of the overall background image. Thus, the image processing system 100 can save the communication band of the communication line 102.

Fourth Embodiment

The present embodiment will describe the processing of deciding a region by an image processing system 100 in S405 based on the camera parameters of capturing apparatuses 101.

The system configuration of the image processing system 100 of the present embodiment is similar to that of the first embodiment. The hardware configurations and the functional configurations of capturing apparatuses 101 are similar to those of the first embodiment. The hardware configuration and the functional configuration of a server apparatus 103 are similar to those of the first embodiment.

Figure 15:
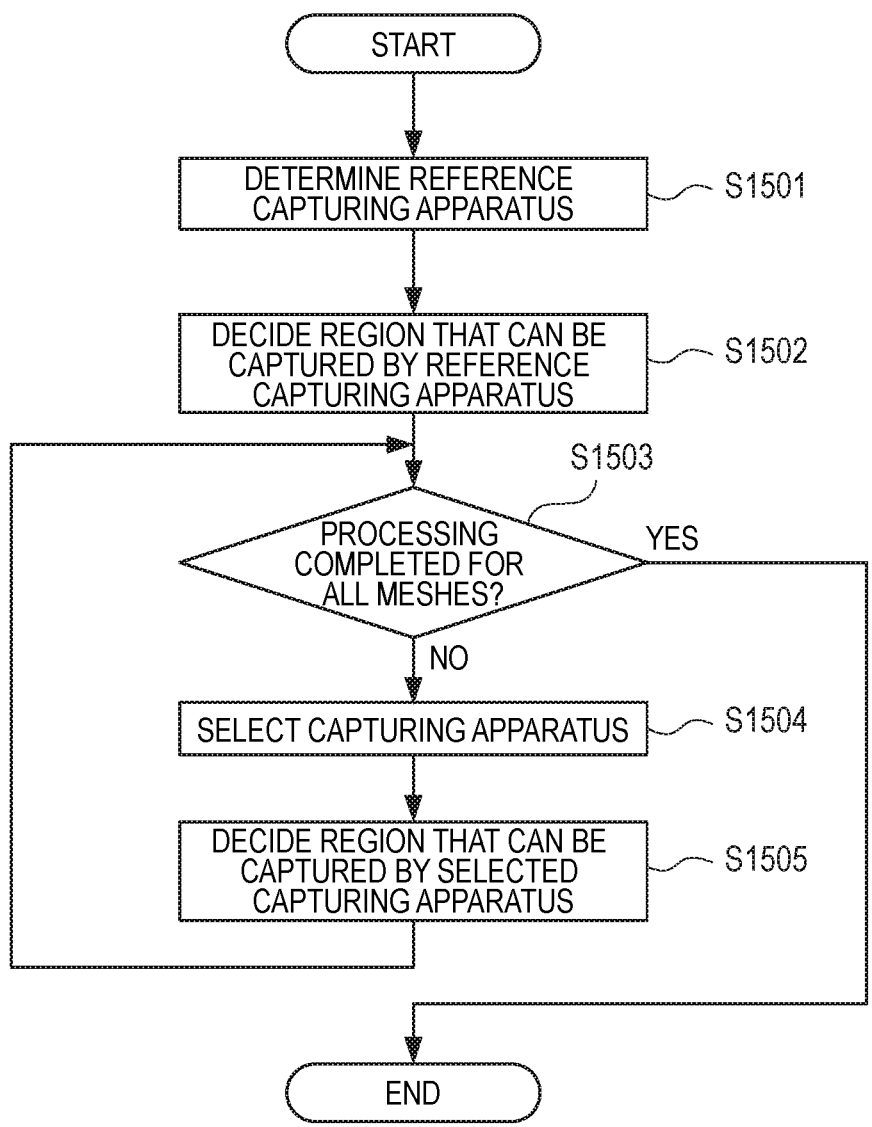
FIG. 15 is a flowchart indicating an example of decision of a region.

The processing of the present embodiment is different from the first embodiment in that the image processing system 100 performs the processing of FIG. 15 instead of the processing of S401 to S406 in FIG. 4. The difference from the first embodiment will be discussed below.

FIG. 15 is a flowchart of an example of region decision by a region deciding unit 319 of the present embodiment.

In S1501, the region deciding unit 319 decides one of the capturing apparatuses 101 as a reference for deciding a region for capturing an image to be projected to a mesh of a background model. Hereinafter, a reference capturing apparatus is the capturing apparatus serving as a reference for deciding a region for capturing an image to be projected to a mesh of the background model. The reference capturing apparatus is an example of a reference capturing unit.

Figure 16:
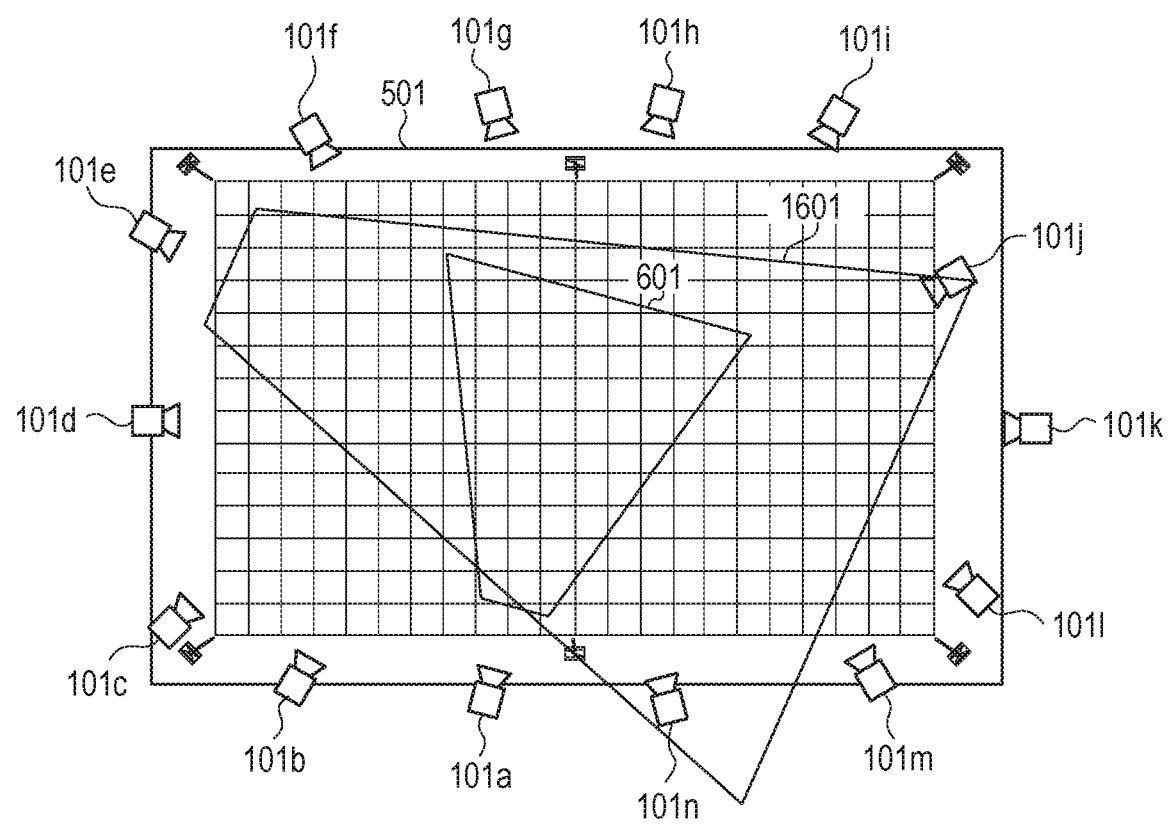
FIG. 16 is an explanatory drawing illustrating an example of the capturing range of the capturing apparatus.

FIG. 16 is an explanatory drawing illustrating an example of the capturing range of the capturing apparatus. As in FIG. 6, a region 601 indicates the capturing range of a capturing apparatus 101a with respect to the background model. A region 1601 indicates the capturing range of a capturing apparatus 101e with respect to the background model. The capturing apparatus 101e has the widest field of view among the capturing apparatuses 101. In the present embodiment, the region deciding unit 319 in S1501 decides, as the reference capturing apparatus, the capturing apparatus 101e having the widest field of view among the capturing apparatuses 101. In S1501, however, the region deciding unit 319 may determine the capturing apparatus capable of capturing regions for the meshes of the largest number of background models as a reference capturing apparatus among the capturing apparatuses 101. Alternatively, in S1501, the region deciding unit 319 may determine predetermined one of the capturing apparatuses 101 as a reference capturing apparatus. In S1501, the region deciding unit 319 may determine specified one of the capturing apparatuses as a reference capturing apparatus based on a user operation through the operation unit of the server apparatus 103.

In S1502, the region deciding unit 319 specifies meshes of the background model. The specified meshes have been transformed into a camera coordinate system of the reference capturing apparatus and are included in an image captured by the reference capturing apparatus. The region deciding unit 319 decides a region corresponding to each of the meshes specified in an image captured by the reference capturing apparatus decided in S1501 (a region including the mesh transformed into the camera coordinate system), as a region for capturing an image to be projected to each of the meshes.

Figure 17:
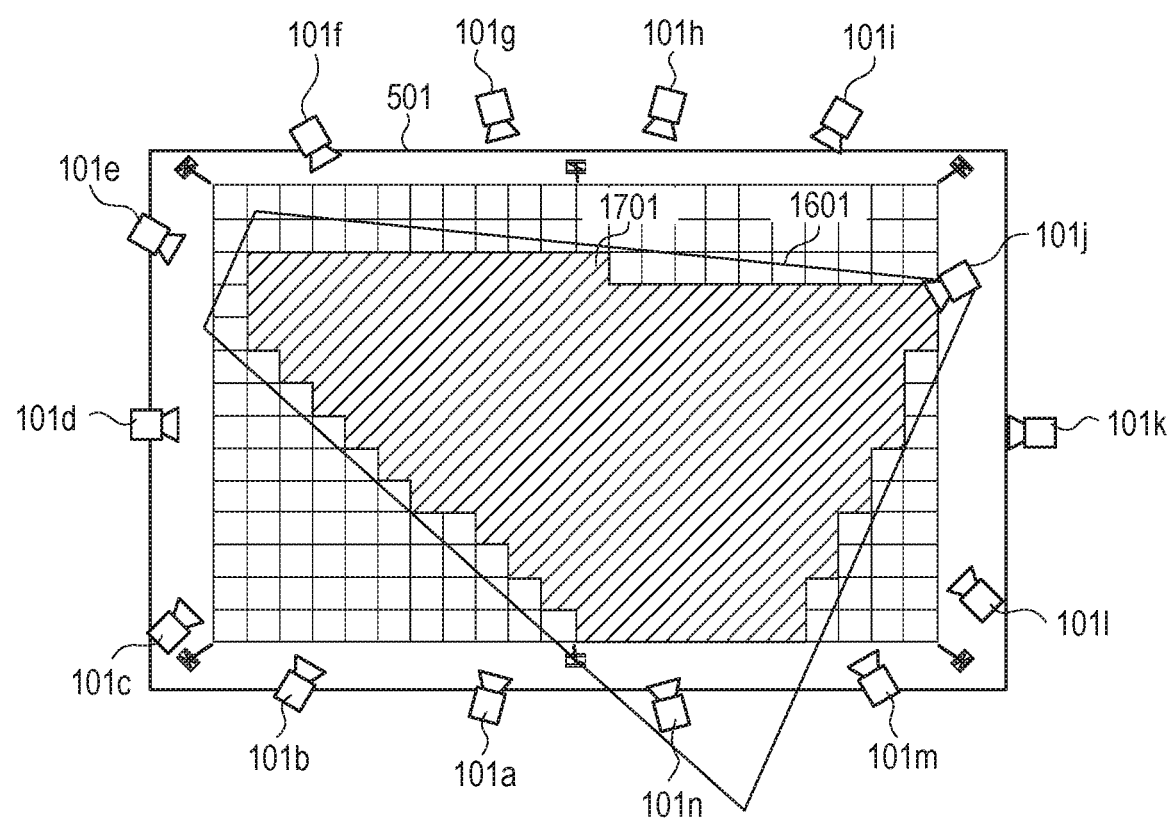
FIG. 17 is an explanatory drawing illustrating an example of meshes where an image to be projected is captured.

FIG. 17 is an explanatory drawing illustrating an example of meshes where an image to be projected by the reference capturing apparatus is captured. A hatched region 1701 is a mesh region for capturing an image to be projected by the reference capturing apparatus. In meshes in other regions, a region for capturing an image to be projected has not been decided.

In S1503, the region deciding unit 319 decides whether a region for capturing an image to be projected has been decided for all the meshes in the background model. If the region deciding unit 319 decides that a region for capturing an image to be projected has been decided for all the meshes in the background model, the processing of FIG. 15 is completed and the process advances to the processing of S407. If the region deciding unit 319 decides that a region for capturing an image to be projected has not been decided for all the meshes in the background model, the process advances to the processing of S1504.

If the reference capturing apparatus is a capturing apparatus 101e and the processing of S1503 is performed for the first time after the processing of S1502, the region deciding unit 319 advances to the processing of S1503 because a region for capturing an image to be projected has not been decided for all the meshes as illustrated in FIG. 17.

In S1504, the region deciding unit 319 selects capturing apparatus candidates for capturing a region for capturing an image to be projected to meshes of the background model, based on the camera parameters of the reference capturing apparatus and the other capturing apparatuses 101. Hereinafter, the capturing apparatus selected in the processing of S1504 will be referred to as a selected capturing apparatus.

Figure 18:
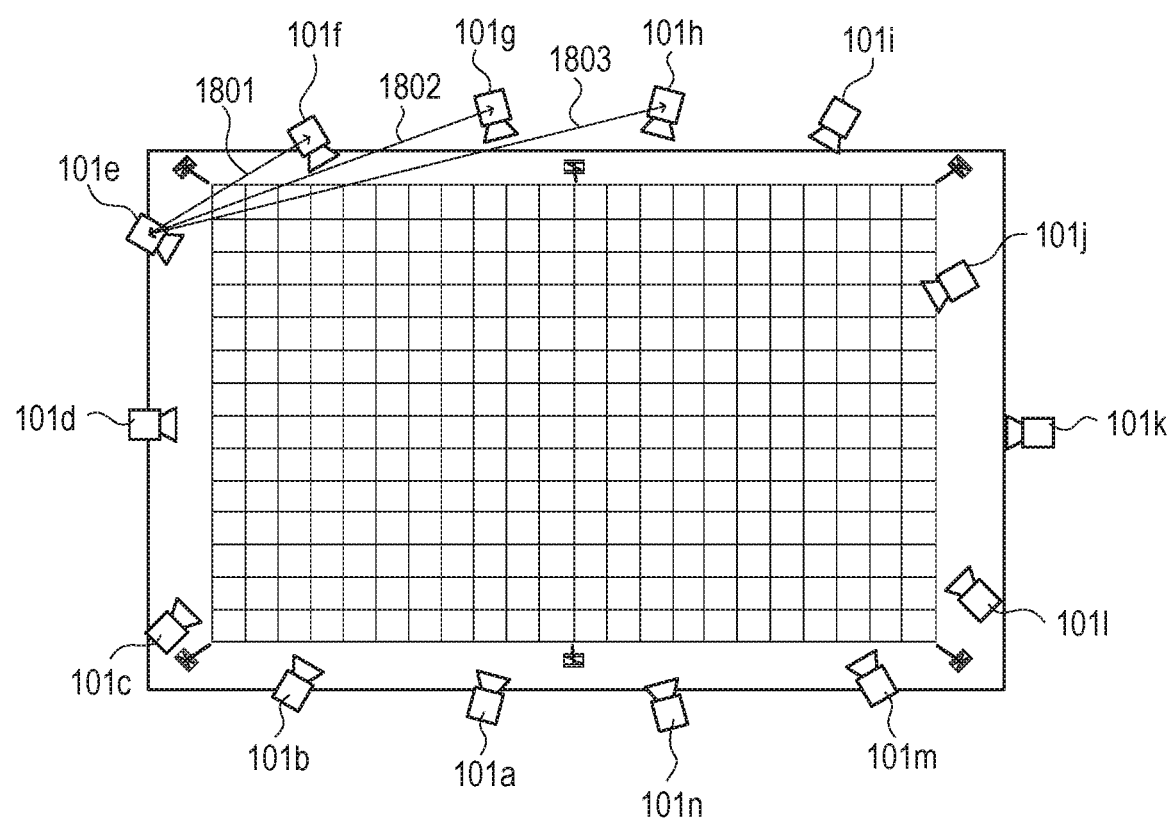
FIG. 18 is an explanatory drawing illustrating an example of the positional relationship between a reference capturing apparatus and the other capturing apparatuses.

FIG. 18 is an explanatory drawing illustrating an example of the positional relationship between the reference capturing apparatus and the other capturing apparatuses. The region deciding unit 319 obtains distances between the coordinates (one of the camera parameters) of the capturing apparatus 101e serving as the reference capturing apparatus in the world coordinate system and the coordinates of the other capturing apparatuses 101 in the world coordinate system. In the example of FIG. 18, the capturing apparatus 101e serving as the reference capturing apparatus and the capturing apparatus 101f are separated from each other by a distance 1801. The capturing apparatus 101e serving as the reference capturing apparatus and a capturing apparatus 101g are separated from each other by a distance 1802. The capturing apparatus 101e serving as the reference capturing apparatus and a capturing apparatus 101h are separated from each other by a distance 1803.

FIG. 19 is an example of a table in which the capturing apparatuses 101 other than the reference capturing apparatus are arranged in the ascending order of distances from the reference capturing apparatus. In the example of FIG. 19, the capturing apparatus 101f is the closest to the reference capturing apparatus. Thus, when the processing of S1504 is performed for the first time after the processing of FIG. 15 is started, the region deciding unit 319 selects the capturing apparatus 101f having the closest value to the reference capturing apparatus regarding the coordinates serving as the camera parameters in the world coordinate system. Moreover, when the processing of S1504 is performed, the region deciding unit 319 selects the capturing apparatus having the closest value to the reference capturing apparatus from among the capturing apparatuses 101 having been unselected in S1504, regarding the coordinates serving as the camera parameter in the world coordinate system.

In S1505, from among the meshes of the background model, the region deciding unit 319 specifies meshes that can be captured by the selected capturing apparatus over the corresponding region. The meshes are specified from among meshes where a region for capturing an image to be projected has not been decided. Furthermore, the region deciding unit 319 decides a region obtained by transforming the region of the specified meshes to the camera coordinate system of the selected capturing apparatus, as a region for capturing an image projected to the meshes. Then, the region deciding unit 319 advances to the processing of S1503. Through the processing of FIG. 15, the background texture deciding unit 315 transmits information on the region decided by the region deciding unit 319 as region information to a rendering unit 317.

Figure 20:
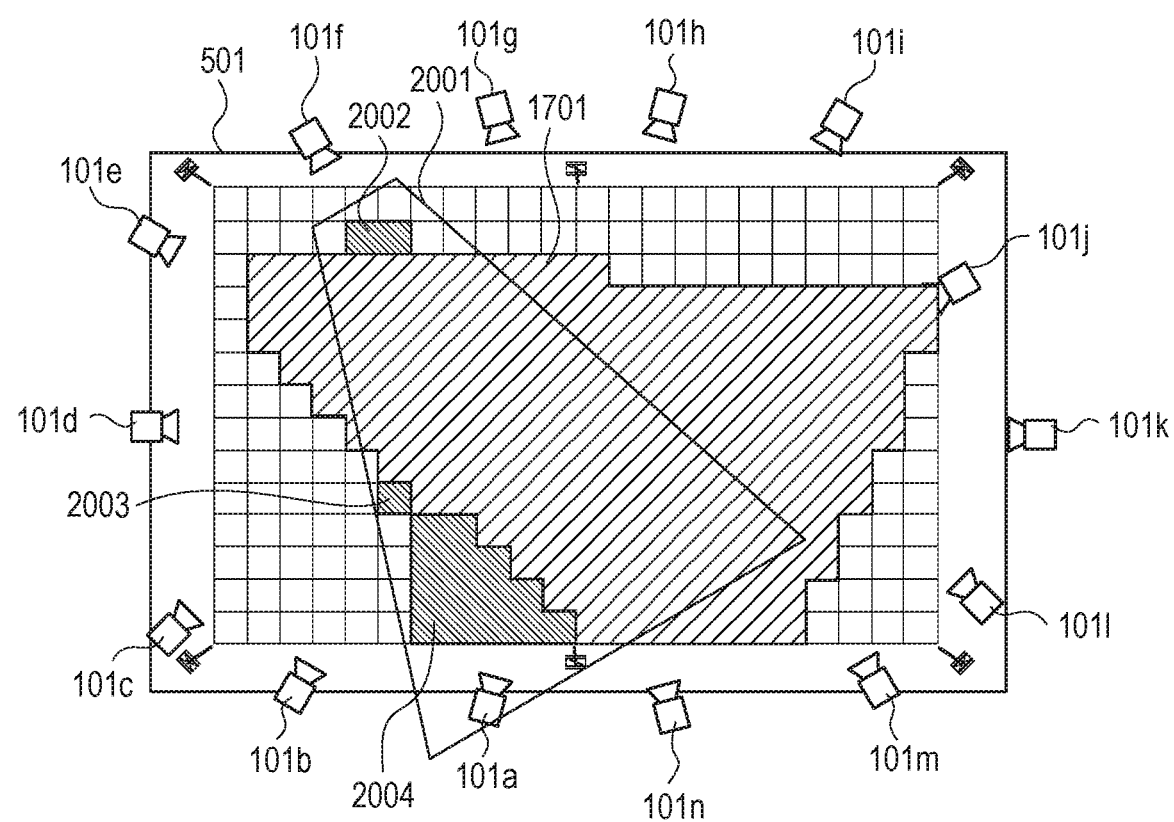
FIG. 20 is an explanatory drawing illustrating an example of meshes where an image to be projected is captured.

FIG. 20 is an explanatory drawing of an example of meshes where an image to be projected is captured by the selected capturing apparatus. In the example of FIG. 20, the selected capturing apparatus is the capturing apparatus 101f. A region 2001 indicates the capturing range of the capturing apparatus 101f. From among meshes included in the region 2001, an image to be projected is captured by the capturing apparatus 101f in meshes not included in the region 1701. In the example of FIG. 20, an image to be projected is captured by the capturing apparatus 101f in meshes included in regions 2002 to 2004.

In the present embodiment, the image processing system 100 decides the reference capturing apparatus and specifies meshes captured by the reference capturing apparatus over the corresponding region from among the meshes of the background model. Regarding the specified meshes, the image processing system 100 decides a region corresponding to the meshes in an image captured by the reference capturing apparatus, as a region for capturing an image to be projected to the meshes.

Furthermore, the image processing system 100 sequentially selects the capturing apparatuses 101, starting from the capturing apparatus with a camera parameter closest to the reference capturing apparatus, and then performs the following processing: From an image captured by the selected capturing apparatus, the image processing system 100 decides a region for capturing an image to be projected to the meshes of the background model. More specifically, from among the meshes of the background model, the image processing system 100 specifies meshes captured by the selected capturing apparatus over the corresponding region. A region for capturing an image to be projected has not been decided. Moreover, regarding the specified meshes, the image processing system 100 decides a region corresponding to the meshes in an image captured by the selected capturing apparatus, as a region for capturing an image to be projected to the meshes. For all the meshes in the background model, the image processing system 100 performs the processing until a region for capturing an image to be projected is decided.

Thus, in the image processing system 100, an image to be projected to the meshes of the background model is captured by the reference capturing apparatus and the capturing apparatus having the camera parameter close to the reference capturing apparatus. Thus, the image processing system 100 can finally generate a more natural background model in which an image close to the capturing conditions is projected in each mesh.

Furthermore, regarding all the meshes that can be captured by the capturing apparatus in S1502 and S1505, the image processing system 100 decides a region for capturing an image to be projected to all the meshes. The region is decided from an image captured by the capturing apparatus. Thus, an image included in an image captured by the same capturing apparatus is projected to more adjacent meshes. Hence, the image processing system 100 can generate a more natural background model with more naturally continuing meshes.

In the present embodiment, the image processing system 100 decides a region for capturing an image to be projected to the meshes of the background model based on the coordinates of the reference capturing apparatus and other capturing apparatuses 101 in the world coordinate system. The image processing system 100 may however decide a region for capturing an image to be projected to the meshes of the background model, based on the camera parameters other than the coordinates of the reference capturing apparatus and the other capturing apparatuses 101 in the world coordinate system. For example, the region deciding unit 319 in S1504 may sequentially select the selected capturing apparatuses, starting from the capturing apparatus having an exposure value closest to the reference capturing apparatus. The exposure value is a camera parameter. Moreover, the region deciding unit 319 in S1504 may sequentially select the selected capturing apparatuses, starting from the capturing apparatus with a capturing direction closest to the reference capturing apparatus. The capturing direction is a camera parameter.

Fifth Embodiment

In the present embodiment, an image processing system 100 decides a region for capturing an image to be projected to each mesh of the background model, based on the camera parameters of a virtual camera and capturing apparatuses 101.

The system configuration of the image processing system 100 of the present embodiment is similar to that of the first embodiment. The hardware configurations of the capturing apparatuses 101 are similar to those of the first embodiment. The hardware configuration of a server apparatus 103 is similar to that of the first embodiment.

FIG. 3B illustrates the functional configuration of the server apparatus 103 according to the present embodiment. An image obtaining unit 311, a calibrating unit 312, a background model managing unit 313 and a rendering unit 317 of the present embodiment are similar to those of the first embodiment.

A virtual camera control unit 316 has the function of transmitting the camera parameter of a virtual camera to a background texture deciding unit 315 in addition to the function described in the first embodiment.

The calibrating unit 312 has the function of transmitting the camera parameters of the capturing apparatuses 101 to the background texture deciding unit 315 in addition to the function described in the first embodiment.

The background texture deciding unit 315 transforms the meshes of the background model, which is obtained from the background model managing unit 313, to a region on an image obtained from the image obtaining unit 311 (a region on camera coordinates). The camera parameters obtained from the calibrating unit 312 are used for the transformation. The background texture deciding unit 315 selects, from among transformed regions, a region for capturing an image to be projected to the corresponding mesh. At this point, the background texture deciding unit 315 has the function of deciding an optimum region for a virtual viewpoint.

Figure 21:
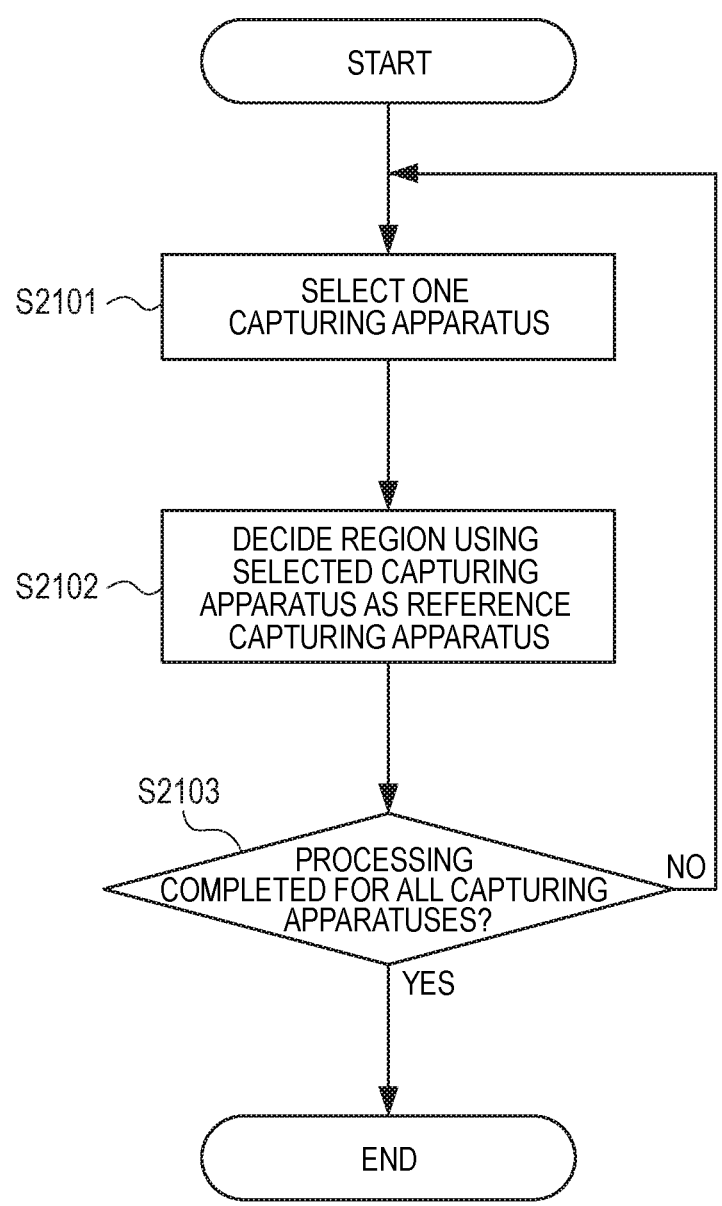
FIG. 21 is a flowchart of an example of preprocessing.

FIG. 21 is a flowchart of an example of preprocessing performed by the server apparatus 103 of the present embodiment before the virtual viewpoint image is generated.

In S2101, the background texture deciding unit 315 selects one of the capturing apparatuses 101.

In S2102, a region deciding unit 319 performs the processing of S1502 to S1505 by temporarily using the capturing apparatus selected in S2101 as a reference capturing apparatus, thereby deciding a region for capturing an image to be projected to the meshes of the background model. The background texture deciding unit 315 then stores information on the decided region in, for example, an auxiliary memory 303 as region information for the capturing apparatus selected in S2101.

In S2103, the region deciding unit 319 determines whether the processing of S2102 has been completed for all of the capturing apparatuses 101. If the region deciding unit 319 determines that the processing of S2102 has been completed for all of the capturing apparatuses 101, the processing of FIG. 21 is completed. If the region deciding unit 319 determines that the processing of S2102 has not been completed for all of the capturing apparatuses 101, the process advances to the processing of S2101.

The processing of FIG. 21 can prepare region information corresponding to each of the capturing apparatuses 101.

Figure 22:
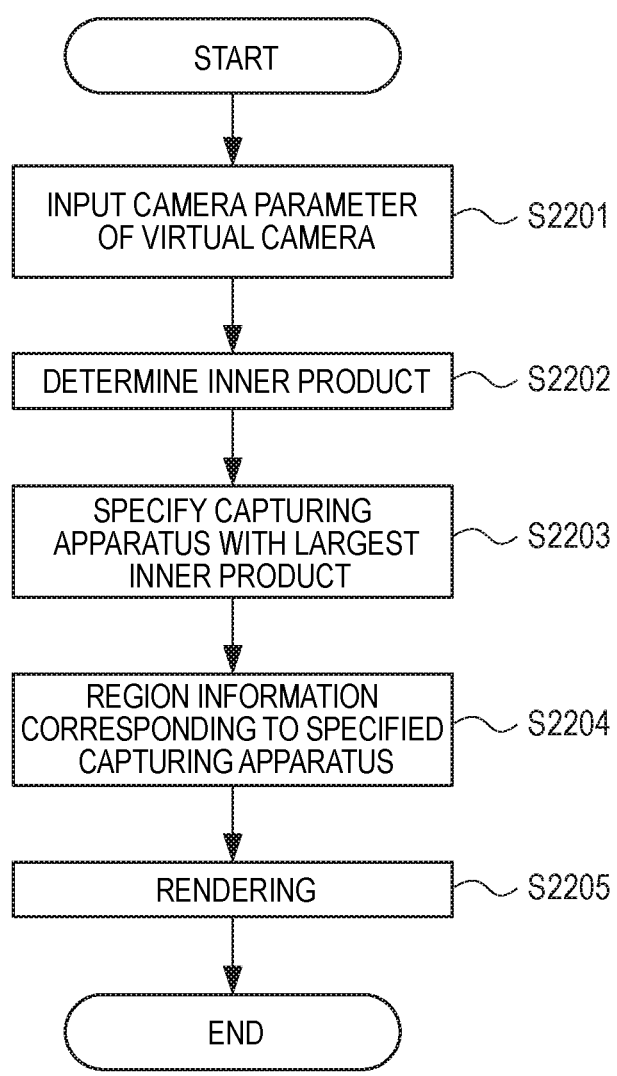
FIG. 22 is a flowchart of an example of background generation.

FIG. 22 is a flowchart showing an example of the generation of a virtual viewpoint image by the image processing system of the present embodiment. In the present embodiment, the virtual camera is the reference capturing apparatus serving as a reference for deciding a region for capturing an image to be projected to the meshes of the background model.

In S2201, the virtual camera control unit 316 receives an input of the camera parameter of the virtual camera based on a user operation through the operation unit of the server apparatus 103.

Figure 23:
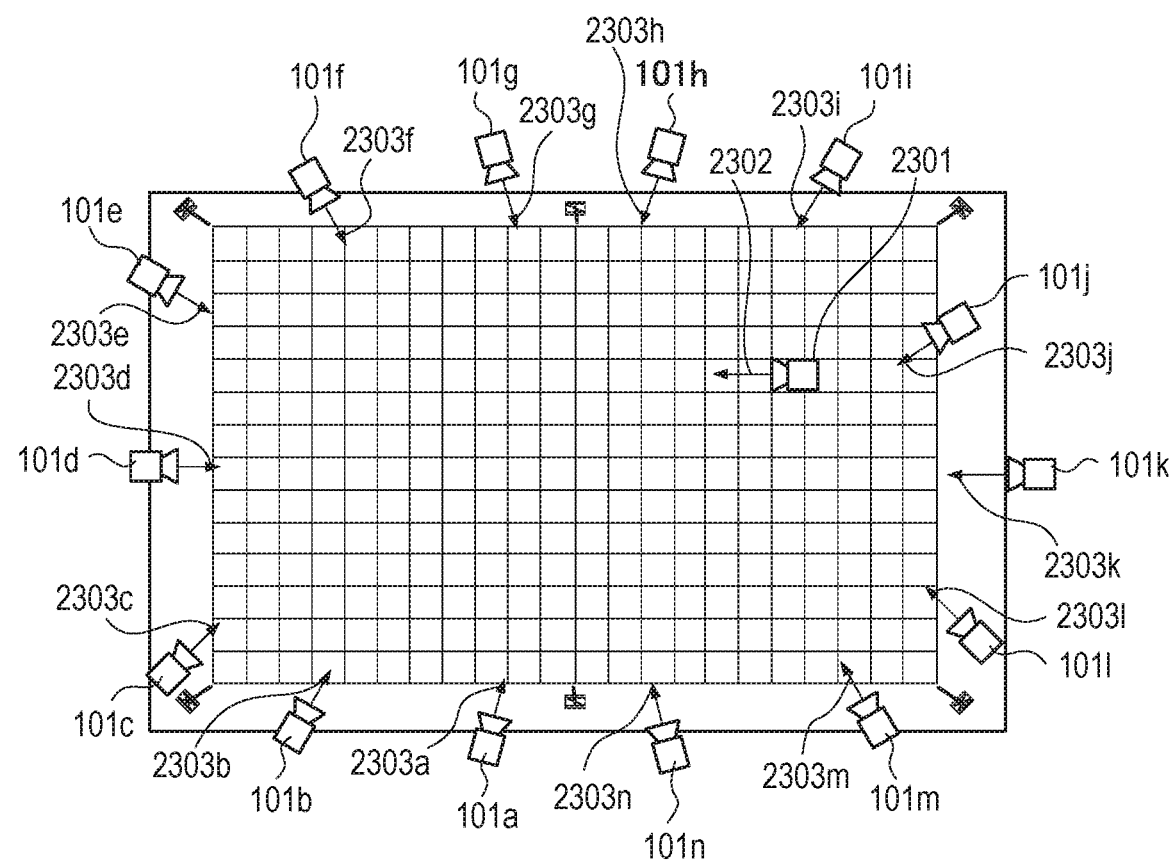
FIG. 23 is an explanatory drawing illustrating an example of the orientations of a virtual viewpoint and the capturing apparatuses.

In S2202, based on the camera parameter received in S2201 and the camera parameter obtained from calibrating unit 312, the background texture deciding unit 315 performs the following processing: The background texture deciding unit 315 determines the inner product of a vector in a capturing direction, that is, the camera parameter received in S2201 and a vector in a capturing direction, that is, the camera parameter obtained from the calibrating unit 312. FIG. 23 is an explanatory drawing illustrating an example of the orientations of the virtual camera and the capturing apparatuses 101. A virtual camera 2301 is a virtual camera directed in a direction indicated by a vector 2302. The vector 2302 is a normalized vector with a length of 1. Vectors 2303a to 2303n indicating the orientations of the capturing apparatuses 101 are each normalized with a length of 1. The background texture deciding unit 315 determines an inner product of the vector 2302 and each of the vectors 2303a to 2303n. The vector 2302 and the vectors 2303a to 2303n are examples of information on capturing directions serving as camera parameters.

In S2203, the background texture deciding unit 315 specifies the capturing apparatus 101 corresponding to the largest value of the inner products determined in S2202. In the example of FIG. 23, the background texture deciding unit 315 specifies the capturing apparatus 101k directed along the vector 2303k that is most analogous to the vector 2302 from among the vectors 2303a to 2303n.

In S2204, the background texture deciding unit 315 transmits region information to the rendering unit 317. The region information corresponds to the capturing apparatus specified in S2203 and is stored in, for example, the auxiliary memory 303 in S2102.

In S2205, the rendering unit 317 projects an image to the corresponding mesh of the background model. The image is indicated by the region information, which is transmitted in S2204, in an image captured by each of the capturing apparatuses 101. Thereafter, the rendering unit 317 renders the image based on the camera parameters of the virtual camera specified from the virtual camera control unit 316, and generates a virtual viewpoint image.

In the present embodiment, the image processing system specifies the capturing apparatus by using the inner product of the vectors as to the orientations of the virtual camera and the capturing apparatuses 101 in S2203. However, the image processing system may specify the capturing apparatus based on the coordinates of the virtual camera and the capturing apparatuses 101 in S2202 (for example, based on distances between the virtual camera and the capturing apparatuses 101). For example, instead of the processing of S2202 to S2203, the image processing system may specify the capturing apparatus most analogous to the virtual camera, and region information corresponding to the specified capturing apparatus may be used. In this case, in the example of FIG. 23, the image processing system specifies, for example, a capturing apparatus 101*j* most analogous to the virtual camera 2301.

In the present embodiment, the image processing system specifies the capturing apparatus with the capturing direction most analogous to that of the virtual camera as a camera parameter from among the capturing apparatuses 101, and the image processing system projects an image to the meshes of the background model according to the region information for the specified capturing apparatus.

Thus, in the image processing system, the region information is usable for the capturing apparatus with characteristics closer to those of the virtual camera, allowing the virtual camera to more properly capture a virtual viewpoint image.

Sixth Embodiment

The present embodiment will describe processing for handling a malfunction, for example, when a proper image for generating a virtual viewpoint image cannot be obtained from capturing apparatuses 101 included in an image processing system 100.

The system configuration of the image processing system 100 of the present embodiment is similar to that of the first embodiment. The hardware configurations and the functional configurations of the capturing apparatuses 101 are similar to those of the first embodiment. The hardware configuration and the functional configuration of a server apparatus 103 are similar to those of the first embodiment.

Figure 24:
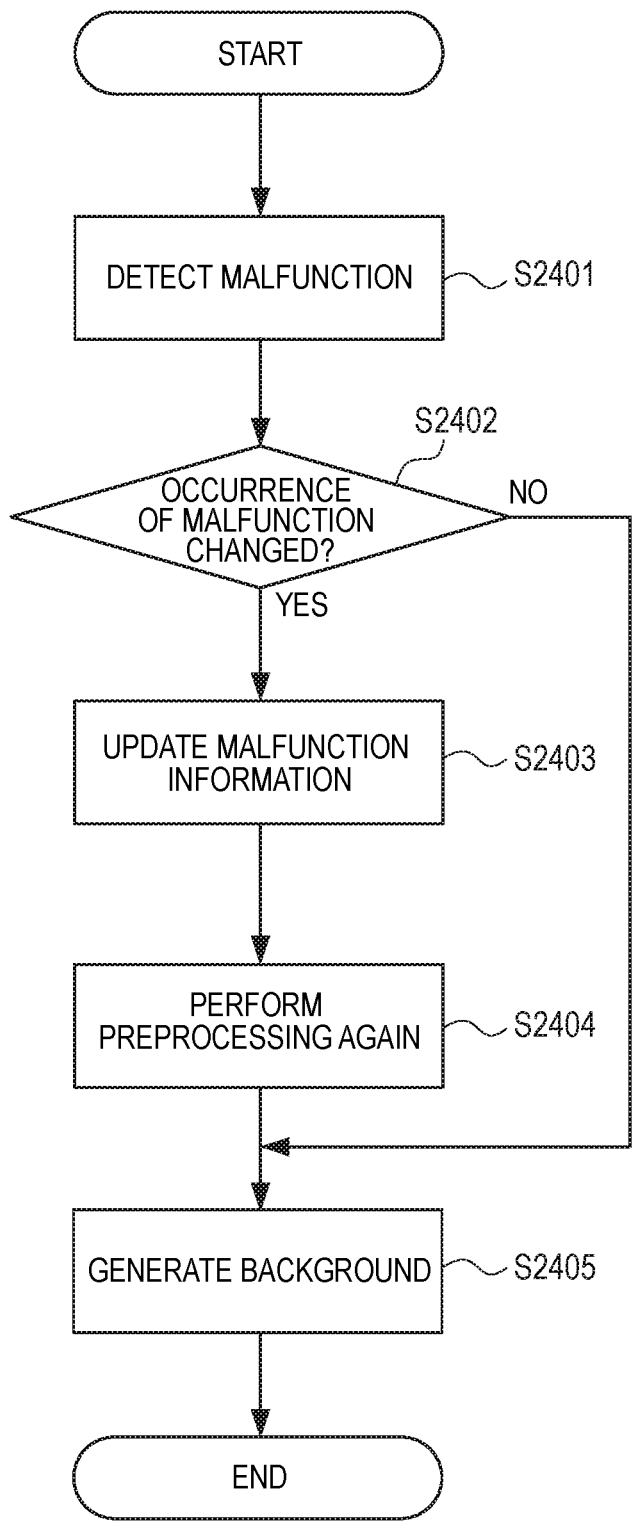
FIG. 24 is a flowchart of an example of processing when a malfunction is detected.

Differences between the processing of the present embodiment and the first to fifth embodiments will be discussed below:

FIG. 24 is a flowchart of an example of processing when the image processing system 100 detects a malfunction in which a proper image for generating a virtual viewpoint image cannot be obtained from the capturing apparatuses 101. Referring to FIG. 24, the processing of the present embodiment will be discussed below. Hereinafter, a malfunction simply refers to the case where a proper image for generating a virtual viewpoint image cannot be obtained from the capturing apparatuses 101. The malfunction is, for example, a failure of the capturing apparatus 101, a change of a position or orientation due to a strong wind, a change of a position or orientation due to collision with a bird or a flying object, a failure of a communication line 102 (e.g., a disconnection), or a shortage of the communication band of the communication line 102. Alternatively, the malfunction is a blurred image in the capturing apparatus 101 or unexpected fluctuations in exposure value in the capturing apparatus 101.

The image processing system 100 can perform the processing of FIG. 24 at any time. For example, the image processing system 100 may periodically perform the processing of FIG. 24 at predetermined intervals.

Alternatively, the image processing system 100 may perform the processing of FIG. 24 according to the predetermined conditions. The image processing system 100 may perform the processing of FIG. 24 only once according to the predetermined conditions or may perform the processing of FIG. 24 each time the conditions are satisfied.

For example, the image processing system 100 may perform the processing of FIG. 24 when a predetermined number of (e.g., one or ten) virtual viewpoint images is generated. The image processing system 100 may perform the processing of FIG. 24 each time a background image is captured by the capturing apparatus 101.

Alternatively, the image processing system 100 may perform the processing of FIG. 24 if a determining unit 318 determines that at least a part of the background image captured by each of the capturing apparatuses 101 is not suitable for generating a virtual viewpoint image. The image processing system 100 may perform the processing of FIG. 24 when the determining unit 318 detects a communication failure between the determining unit 318 and the capturing apparatuses 101 through a network I/F 304 and the communication line 102.

Alternatively, the image processing system 100 may perform the processing of FIG. 24 when information on a malfunction is inputted from a user through, for example, the operation unit of the server apparatus 103.

In S2401, the determining unit 318 detects a malfunction in which a proper image for generating a virtual viewpoint image cannot be obtained from the capturing apparatuses 101.

The determining unit 318 detects a malfunction by receiving, from the capturing apparatus 101, information on the malfunction (e.g., a failure, a change of the position or orientation, a blurred image, or fluctuations in exposure value) in the capturing apparatus 101 through, for example, the network I/F 304. In this case, the capturing apparatus 101 detects, for example, a malfunction of the capturing apparatus 101 (e.g., a failure, a blurred image, fluctuations in exposure value, or a change of the position or orientation) and transmits information on the detected failure to the server apparatus 103.

The determining unit 318 may detect a malfunction when detecting a communication failure from the capturing apparatuses 101 for a period of at least a predetermined threshold value. If the determining unit 318 does not receive a packet indicating the establishment of communications from the capturing apparatuses 101 for a period of at least the predetermined threshold value, the determining unit 318 may detect a malfunction at the detection of a communication failure with the capturing apparatuses 101.

Alternatively, the determining unit 318 may detect a malfunction if information on a malfunction, e.g., a failure of the capturing apparatus 101 is inputted from a user through, for example, the operation unit of the server apparatus 103.

In the present embodiment, malfunction information is stored in a main memory 302. The malfunction information indicates a current malfunction and the capturing apparatus that is prevented from obtaining a proper background image by the malfunction. In the absence of a malfunction, the determining unit 318 may store the malfunction information indicating no malfunctions or may store vacant information.

In S2402, the determining unit 318 compares the malfunction detected in S2401 and the malfunction indicated in the malfunction information stored in an auxiliary memory 303 and determines whether the occurrence of malfunctions has changed or not. If the determining unit 318 determines that the occurrence of malfunctions has changed, the process advances to the processing of S2403. If the determining unit 318 determines that the occurrence of malfunctions has not changed, the process advances to the processing of S2405.

In S2403, the determining unit 318 updates the malfunction information stored in the main memory 302 such that the malfunction information indicates the malfunction detected in S2401 and the capturing apparatus 101 prevented from obtaining a proper background image by the malfunction.

The processing of S2404 is the processing of FIG. 4. The processing is performed without using the capturing apparatus 101 unable to obtain a proper image as indicated in the malfunction information stored in the main memory 302. The processing of S2404 is different from the processing of FIG. 4 of the first embodiment in the contents of processing in S402 and S404. S402 and S404 in the processing of S2404 will be described below. In S402, a background texture deciding unit 315 selects one of the capturing apparatuses 101 except for the capturing apparatus 101 unable to obtain a proper image as indicated by the malfunction information. In S2404, on all the capturing apparatuses 101 except for the capturing apparatus 101 unable to obtain a proper image as indicated by the malfunction information, a coordinate transforming unit 314 in S404 performs the following processing: The coordinate transforming unit 314 performs processing for determining whether the processing of S403 on the mesh extracted in S401 has been completed or not. If the coordinate transforming unit 314 determines that the processing has been completed, the process advances to the processing of S405. If the coordinate transforming unit 314 determines that the processing has not been completed, the process advances to the processing of S402. In this way, the server apparatus 103 generates region information again such that an image captured by the capturing apparatus 101 unable to obtain a proper image is not used for an image to be projected to the meshes of the background model of a virtual viewpoint image.

If the server apparatus 103 performs the processing of FIG. 24 for the first time, the processing of S2404 may be performed to generate a background image regardless of the result of determination in S2402.

The processing of S2404 may be processing performed in any one of FIGS. 13, 15 and 21 without using the capturing apparatus 101 unable to obtain a proper image as indicated in the malfunction information stored in the main memory 302.

First, if the processing of S2404 is the processing of FIG. 13, the processing being performed without using the capturing apparatus 101 unable to obtain a proper image as indicated in the malfunction information, the processing of S2404 is different from the processing of FIG. 13 of the third embodiment in the contents of processing in S402 and S404. The processing in S402 and S404 in the processing of S2404 in this case will be described below. In S402, a background texture deciding unit 315 selects one of the capturing apparatuses 101 except for the capturing apparatus 101 unable to obtain a proper image as indicated by the malfunction information. In S404, on all the capturing apparatuses 101 except for the capturing apparatus 101 unable to obtain a proper image as indicated in the malfunction information, the coordinate transforming unit 314 determines whether the processing of S403 on the mesh extracted in S401 has been completed or not. If the coordinate transforming unit 314 determines that the processing has been completed, the process advances to the processing of S405. If the coordinate transforming unit 314 determines that the processing has not been completed, the process advances to the processing of S402.

Subsequently, if the processing of S2404 is the processing of FIG. 15, the processing being performed without using the capturing apparatus 101 unable to obtain a proper image as indicated in the malfunction information, the processing of S2404 is different from the processing of FIG. 15 of the fourth embodiment in the contents of processing in S1501 and S1504. The processing in S1501 and S1504 in the processing of S2404 in this case will be described below. In S1501, a region deciding unit 319 selects a reference capturing apparatus from the capturing apparatuses 101 except for the capturing apparatus 101 unable to obtain a proper image as indicated in the malfunction information. In S1504, the region deciding unit 319 selects a selected capturing apparatus from the capturing apparatuses 101 except for the capturing apparatus 101 unable to obtain a proper image as indicated in the malfunction information.

In S1501 in the processing of S2404, the region deciding unit 319 may select the reference capturing apparatus from the capturing apparatuses 101 including the capturing apparatus 101 unable to obtain a proper image as indicated in the malfunction information. In other words, in S1501, the malfunctioning capturing apparatus 101 may be selected as the reference capturing apparatus. In this case, in S1504, the selected capturing apparatus is one of the capturing apparatuses 101 except for the reference capturing apparatus based on the positional relationship with the malfunctioning reference capturing apparatus. As compared with a method of changing the reference capturing apparatus in the event of a malfunction, the above-mentioned method of selecting the capturing apparatus 101 hardly changes the selected capturing apparatus before and after the occurrence of a malfunction. This does not largely change a background image and thus suppresses an unnatural feeling of a user.

If the processing of S2404 is processing performed in FIG. 21 without using the capturing apparatus 101 unable to obtain a proper image as indicated in the malfunction information, the processing of S2404 is different from the processing of FIG. 21 of the fifth embodiment in the contents of processing in S2101 and S2103. The processing of S2101 and S2103 in the processing of S2404 in this case will be described below. In S2101, the background texture deciding unit 315 selects one of the capturing apparatuses 101 except for the capturing apparatus 101 unable to obtain a proper image as indicated in the malfunction information. In S2103, on all the capturing apparatuses 101 except for the capturing apparatus 101 unable to obtain a proper image as indicated in the malfunction information, the region deciding unit 319 decides whether the processing of S2102 has been completed or not: If the region deciding unit 319 determines that the processing has been completed, the process of FIG. 21 is completed. If the region deciding unit 319 determines that the processing has not been completed, the process advances to the processing of S2101.

The processing of S2405 is the processing of FIG. 8. The processing is performed based on the region information (information on the region (texture region) for capturing an image to be projected to the meshes of the background model) obtained by the processing of S2404. If it is determined that the occurrence of a malfunction has not changed in S2402, the processing of S2405 is performed based on the region information obtained in the processing of S2404 in the past processing of FIG. 24. The processing of S2405 may be processing performed in FIG. 14 based on the region information obtained in the processing of S2404. Alternatively, the processing of S2405 may be processing performed in FIG. 22 based on the region information obtained in the processing of S2404.

In the present embodiment, the image processing system 100 detects a malfunction in which a proper image cannot be obtained from the capturing apparatuses 101. Moreover, the image processing system 100 determines a region for capturing an image to be projected to the meshes of the background model, except for the region of an image captured by the capturing apparatus 101 unable to obtain a proper image. Thus, even if a malfunction occurs, the image processing system 100 projects an image, which is captured by the capturing apparatus 101 capable of obtaining a proper image, to the meshes of the background model. This can generate a proper background image for a virtual viewpoint image.

In the present embodiment, the malfunctioning capturing apparatus 101 may reduce the range of a background texture that can be generated. For example, FIG. 6 illustrates that the mesh 502 of the first embodiment is captured by the capturing apparatus 101*a*. In this case, the mesh 502 corresponds to a region that is not captured by any of the capturing apparatuses 101 other than the capturing apparatus 101*a*. In this case, any one of the capturing apparatuses 101 cannot capture an image to be projected to the mesh 502.

In such a case, the image processing system 100 may be configured as follows: An image obtaining unit 311 stores at least one of the latest images in the main memory 302 and the auxiliary memory 303. The images are captured in the normal operations of the capturing apparatuses 101. For example, an image cannot be captured due to a malfunction such as a failure of the capturing apparatus 101*a* and a region not captured by any other capturing apparatuses 101 is generated. In this case, in the image processing system 100, the image of the region may be an image stored in the main memory 302 or the auxiliary memory 303. The image has been captured by the capturing apparatus 101*a* in the past.

If a region corresponding to a mesh is captured by the capturing apparatuses 101, the image processing system may be configured as follows: The image obtaining unit 311 may store at least one of the latest images in the main memory 302 and the auxiliary memory 303. The images are captured in the normal operations of the capturing apparatuses 101. In this case, even if some of the capturing apparatuses 101 are faulty, the image processing system 100 can obtain the images of regions captured by the other capturing apparatuses 101. Even if all the capturing apparatuses 101 are faulty, in the image processing system 100, images stored in the main memory 302 and the auxiliary memory 303 may be used for the regions. The images have been captured by the capturing apparatus 101*a* in the past.

In this way, even if all of the capturing apparatuses 101 for capturing an image of a mesh are faulty, the image processing system 100 can generate the background image of a virtual viewpoint image by using the past images.

This processing allows the image processing system 100 to generate a background image even if a region cannot be captured by any of the capturing apparatuses.

Furthermore, in the image processing system 100, images may be captured by the capturing apparatuses 101 before a virtual viewpoint image is generated. The captured images may be stored in the main memory 302 and the auxiliary memory 303 in advance.

Other Embodiments

In the first to sixth embodiments, the server apparatus 103 is a single information processing apparatus. However, the server apparatus 103 may include a plurality of information processing apparatuses. In this case, the CPUs of the information processing apparatuses constituting the server apparatus 103 perform processing in a coordinated fashion according to programs stored in the auxiliary memories of the information processing apparatuses constituting the server apparatus 103, enabling the following function and processing: the functions of FIGS. 3B and 12, the processing of the server apparatus 103 in the flowcharts of FIGS. 8 and 14, and processing in the flowcharts of FIGS. 4, 13, 15, 21, 22 and 24.

The examples of the embodiments of the present invention were specifically discussed. The present invention is not limited to the specific embodiments. The embodiments may be optionally combined or appropriately modified. The embodiments can reduce the load of processing for projecting an image to a model.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-232886, filed Dec. 4, 2017, and Japanese Patent Application No. 2018-127416, filed Jul. 4, 2018 which are hereby incorporated by reference herein in their entirety.

What is claimed is:

1. An information processing apparatus comprising:
one or more memories storing instructions; and
one or more processors executing the instructions to:
obtain capturing information for specifying at least positions and directions of a plurality of capturing apparatuses for capturing images in a plurality of directions;
obtain model information on a background shape model indicating a three-dimensional shape of a background of a virtual viewpoint image that is generated based on the images captured by the plurality of capturing apparatuses; and
generate association information for specifying that at least one of the plurality of capturing apparatuses and an element included in the background shape model are associated and being used for generating the virtual viewpoint image, based on the obtained capturing information and the obtained model information, before the images captured by the plurality of capturing apparatuses are obtained for generating the virtual viewpoint image.

2. The information processing apparatus according to claim 1, wherein the one or more processors further execute the instructions to select a capturing apparatus from among one or more capturing apparatuses capturing a region corresponding to the element included in the background shape model, and as the association information, information for specifying that the selected capturing apparatus and the element included in the background shape model are associated.

3. The information processing apparatus according to claim 2, wherein the capturing apparatus is selected based on a resolution of an area that is included in each of captured images captured by the one or more capturing apparatuses capturing the region corresponding to the element included in the background shape model and that corresponds to the region corresponding to the element included in the background shape model.

4. The information processing apparatus according to claim 2, wherein the capturing apparatus is selected based on a size of the background shape model of the background captured by the one or more capturing apparatuses.

5. The information processing apparatus according to claim 2, wherein the capturing apparatus is selected based on at least one of (i) a relationship between a position of each of the one or more capturing apparatuses and a position of a reference capturing apparatus specified from among the plurality of capturing apparatuses, (ii) a relationship between a direction of each of the one or more capturing apparatuses and a direction of the reference capturing apparatus, and (iii) a relationship between an exposure value of each of the one or more capturing apparatuses and an exposure value of the reference capturing apparatus.

6. The information processing apparatus according to claim 2, wherein the capturing apparatus is selected based on at least one of (i) a relationship between a position of each of the one or more capturing apparatuses and a position of a virtual viewpoint corresponding to a virtual viewpoint image and (ii) a relationship between a direction of each of the one or more capturing apparatuses and a direction from the virtual viewpoint corresponding to the virtual viewpoint image.

7. The information processing apparatus according to claim 2, wherein an area that is included in an image captured by the selected capturing apparatus is associated with the element included in the background shape model and is specified based on the generated association information.

8. The information processing apparatus according to claim 1, wherein the one or more processors further execute the instructions to generate the virtual viewpoint image based on at least one of images captured by the at least one of the plurality of capturing apparatuses specified based on the generated association information.

9. The information processing apparatus according to claim 1, wherein the association information is generated again based on a malfunction occurring in one of the plurality of the capturing apparatuses after the images captured by the plurality of capturing apparatuses are obtained for generating the virtual viewpoint image.

10. The information processing apparatus according to claim 1, wherein the model information includes information on a position of each of a plurality of elements included in the background shape model.

11. The information processing apparatus according to claim 1, wherein the one or more processors further execute the instructions to generate virtual viewpoint images of a plurality of frames based on a plurality of foreground shape models indicating three-dimensional shapes of foregrounds in the frames and the background shape model common to the frames, the images captured by the plurality of capturing apparatuses, and the association information common to the frames.

12. The information processing apparatus according to claim 11, wherein the foreground includes a moving object, and the background includes at least one of a ground and a structure.

13. The information processing apparatus according to claim 1, wherein the one or more processors further execute the instructions to output the generated association information to the at least one capturing apparatus specified based on the generated association information.

14. The information processing apparatus according to claim 1, wherein the one or more processors further execute the instructions to output, to the at least one capturing apparatus specified based on the generated association information, information for causing the at least one capturing apparatus to output a partial image that is a part of image captured by the at least one capturing apparatus and that includes an area corresponding to the element included in the background shape model and specified based on the generated association information.

15. The information processing apparatus according to claim 1, wherein the one or more processors further execute the instructions to obtain, from the at least one capturing apparatus specified based on the generated association information, a partial image that is a part of image captured by the at least one capturing apparatus and that includes an area corresponding to the element included in the background shape model and specified based on the generated association information.

16. The information processing apparatus according to claim 15, wherein the at least one capturing apparatus is configured to generate the partial image.

17. An information processing method comprising:
  obtaining capturing information for specifying at least positions and directions of a plurality of capturing apparatuses for capturing images in a plurality of directions;
  obtaining model information on a background shape model indicating a three-dimensional shape of a background of a virtual viewpoint image that is generated based on the images captured by the plurality of capturing apparatuses; and
  generating association information for specifying that at least one of the capturing apparatuses and an element included in the background shape model are associated and being used for generating the virtual viewpoint image, based on the obtained capturing information and the obtained model information, before the images captured by the plurality of capturing apparatuses are obtained for generating the virtual viewpoint image.

18. The information processing method according to claim 17, further comprising selecting a capturing apparatus from among one or more capturing apparatuses capturing a region corresponding to the element included in the background shape model, and, as the association information, information for specifying that the selected capturing apparatus and the element included in the background shape model are associated.

19. A non-transitory computer-readable storage medium that stores a program for causing a computer to perform an information processing method, the information processing method comprising:

obtaining capturing information for specifying at least positions and directions of a plurality of capturing apparatuses for capturing images in a plurality of directions;

obtaining model information on a background shape model indicating a three-dimensional shape of a background of a virtual viewpoint image that is generated based on the images captured by the plurality of capturing apparatuses; and generating association information for specifying that at least one of the capturing apparatuses and an element included in the background shape model are associated and being used for generating the virtual viewpoint image, based on the obtained capturing information and the obtained model information, before the images captured by the plurality of capturing apparatuses are obtained for generating the virtual viewpoint image.

* * * * *